(12) United States Patent
Guichard et al.

(10) Patent No.: US 9,143,557 B2
(45) Date of Patent: Sep. 22, 2015

(54) FEEDBACK LOOP FOR SERVICE ENGINEERED PATHS

(75) Inventors: James Guichard, New Boston, NH (US); David Ward, Los Gatos, CA (US); Jan Medved, Pleasanton, CA (US); Maciek Konstantynowicz, Haddenham (GB)

(73) Assignee: Juniper Networks, Inc., Sunnyvale, CA (US)

( * ) Notice: Subject to any disclaimer, the term of this patent is extended or adjusted under 35 U.S.C. 154(b) by 125 days.

(21) Appl. No.: 13/534,121

(22) Filed: Jun. 27, 2012

(65) Prior Publication Data

US 2014/0003232 A1    Jan. 2, 2014

(51) Int. Cl.
*H04L 12/28*    (2006.01)
*H04L 29/08*    (2006.01)

(52) U.S. Cl.
CPC ........ *H04L 67/1008* (2013.01); *H04L 67/1025* (2013.01); *H04L 67/1029* (2013.01); *H04L 67/16* (2013.01); *H04L 67/327* (2013.01)

(58) Field of Classification Search
USPC .................................. 370/389; 709/227–238
See application file for complete search history.

(56) References Cited

U.S. PATENT DOCUMENTS

| | | | |
|---|---|---|---|
| 7,027,731 B1 | 4/2006 | Wang et al. | |
| 7,539,775 B2 * | 5/2009 | Rikitake et al. | 709/246 |
| 7,546,635 B1 * | 6/2009 | Krohn et al. | 726/11 |
| 7,633,860 B2 * | 12/2009 | Li | 370/225 |
| 7,693,979 B2 | 4/2010 | Liu | |
| 7,826,482 B1 * | 11/2010 | Minei et al. | 370/467 |
| 7,920,572 B2 | 4/2011 | Bates et al. | |
| 7,948,986 B1 * | 5/2011 | Ghosh et al. | 370/392 |
| 7,991,864 B2 | 8/2011 | Patel et al. | |
| 8,020,200 B1 * | 9/2011 | Krohn et al. | 726/11 |
| 8,224,948 B2 | 7/2012 | Liu | |
| 8,224,971 B1 * | 7/2012 | Miller et al. | 709/227 |
| 8,271,680 B2 * | 9/2012 | Salkewicz | 709/238 |
| 8,484,372 B1 * | 7/2013 | Callon | 709/238 |
| 8,576,841 B2 * | 11/2013 | Ramaraj et al. | 370/389 |
| 8,615,009 B1 * | 12/2013 | Ramamoorthi et al. | 370/389 |
| 2002/0109879 A1 | 8/2002 | Wing So | |
| 2005/0281205 A1 | 12/2005 | Chandwadkar et al. | |
| 2006/0050719 A1 * | 3/2006 | Barr et al. | 370/401 |

(Continued)

OTHER PUBLICATIONS

U.S. Appl. No. 13/339,983, filed Dec. 29, 2011 entitled Multi-Topology Resource Scheduling Within a Computer Network.

(Continued)

*Primary Examiner* — Edan Orgad
*Assistant Examiner* — Emmanuel Maglo
(74) *Attorney, Agent, or Firm* — Shumaker & Sieffert, P.A.

(57) ABSTRACT

In general, techniques are described for providing feedback loops for service engineered paths. A service node comprising an interface and a control unit may implement the techniques. The interface receives traffic via a path configured within a network to direct the traffic from an ingress network device of the path to the service node. The control unit applies one or more services to the traffic received via the path and generates service-specific information related to the application of the one or more services to the traffic. The interface then sends the service-specific information to at least one network device configured to forward the traffic via the path so that the at least one network device configured to forward the traffic via the path is able to adapt the path based on the service-specific information.

39 Claims, 6 Drawing Sheets

(56) References Cited

U.S. PATENT DOCUMENTS

| | | | |
|---|---|---|---|
| 2007/0064702 | A1 | 3/2007 | Bates et al. |
| 2007/0258387 | A1 | 11/2007 | Patel et al. |
| 2008/0195755 | A1 | 8/2008 | Lu et al. |
| 2009/0328219 | A1* | 12/2009 | Narayanaswamy ............ 726/23 |
| 2011/0103263 | A1 | 5/2011 | Unbehagen et al. |
| 2011/0197274 | A1* | 8/2011 | Callon et al. .................... 726/22 |

OTHER PUBLICATIONS

U.S. Appl. No. 13/110,987, filed May 19, 2011 entitled Dynamically Generating Application-Layer Traffic Optimization Protocol Maps.

U.S. Appl. No. 12/182,619, filed Jul. 30, 2008, and entitled Streamlined Packet Forwarding Using Dynamic Filters for Routing and Security in a Shared Forwarding Plane.

"Information Technology-Telecommunications and Information Exchange Between Systems—Intermediate System to Intermediate System Intra-domain Routeing Information Exchange Protocol for Providing the Connectionless-Mode Network Service (ISO 8473)," dated Nov. 15, 2002, 210 pgs.

Ginsberg et al. "Advertising Generic Information in IS-IS," Network Working Group, Internet-Draft, Nov. 10, 2010, 13 pgs.

Lindem et al. "OSPF Transport Instance Extensions" Network Working Group, Internet-Draft, Oct. 10, 2011, 14 pgs.

Lindem et al. "OSPF Multi-Instance Extensions" Network Working Group, Internet-Draft, Oct. 29, 2011, 15 pgs.

Andersson et al. "LDP Specification" Network Working Group, Request for Comments: 5036, Oct. 2007, 136 pgs.

Rekhter et al. "Carrying Label Information in BGP-4" Network Working Group, Request for Comments: 3107, May 2001, 9 pgs.

Response to counterpart European Communication dated Jan. 8, 2014, from Patent Application No. 13173341.2, filed on May 19, 2014, 26 pp.

Extended European Search Report mailed Nov. 21, 2013 in corresponding EP Application No. 13173341.2, 8 pgs.

Office Action from U.S. Appl. No. 13/534,140, dated Aug. 5, 2014, 14 pp.

Response to Office Action mailed Aug. 5, 2014, from U.S. Appl. No. 13/534,140, filed Nov. 5, 2014, 8 pp.

* cited by examiner

FEEDBACK LOOP FOR SERVICE ENGINEERED PATHS

TECHNICAL FIELD

The invention relates to computer networks and, more particularly, to delivery of data within computer networks.

BACKGROUND

Recently, network devices that form computer networks have been adapted to enable a form of networking referred to as "software-defined networking." In software-defined networking, the forwarding plane of a network switch, router or other network device is made available via a communication protocol such that this forwarding plane may be configured via the communication protocol rather than a routing protocol. In many implementations, the network devices may execute software to enable communications with other network devices in the network via this communication protocol so as to configure paths through the network. One example of a communication protocol that facilitates software-defined networking is the so-called "OpenFlow" communication protocol. OpenFlow is an open standard that allows users (e.g., researchers) to install software on the routers to run experimental or proprietary protocols to control packet routing or switching within a network.

The software controlled path setup may then orchestrate the configuration and deployment of paths on an as-needed basis to suit a particular service. To illustrate, orchestrating software that controls path setup may be manually configured with information identifying a network address translation (NAT) service operated by a first network device (service node). A second network device that does not provide a NAT service may communicate with the orchestrating software, learn of this NAT service and subscribe to this service, whereupon the orchestrating software may configure a path through the network from the second network device to the first network device. The second network device may then push traffic requiring NAT service through the path, where the first network device may apply the NAT traffic. When establishing the path, the orchestrating software may configure one or more filters on the second network device controlling admission of network traffic into the path. These paths having been engineered for a particular service, i.e., NAT service in this example, having filters controlling admission to the path may be referred to as "service engineered paths" (or "SEPs"). In this respect, the orchestrating software may define these SEPs to suit a particular service in terms of defining filters tailored for that service.

While SEPs may provide for service sharing and enable other network devices to forward traffic via a path that meets the needs of the service application (e.g., in terms of quality of service (QoS) provided, bandwidth, etc.), SEPs may not generally be responsive to changes in the service application. In other words, the control software managing the forwarding planes of the routers or switches along a SEP may be configured to accommodate network conditions through provisioning of paths that meet certain network requirements (e.g., in terms of bandwidth, quality of service, etc.), but may not be adapted to dynamically or automatically accommodate changes at service nodes.

SUMMARY

In general, the disclosure describes techniques for establishing a feedback loop for communicating service-level information to any network device along a service engineered path (SEP), such as the ingress to the SEP, a transit switch or node of the SEP intermediately positioned between the ingress network device and the end-point service node or another service node (which may occur in examples where two service nodes are along the SEP and both apply a service to the traffic). The techniques may enable a service node to communicate with these intermediate network devices along the SEP using a routing protocol, such as an Intermediate System-to-Intermediate System (IS-IS) routing protocol, an open shortest path first (OSPF) routing protocol and a border gateway protocol (BGP). The service-level information may include any information related to a particular service provided by the service node. By providing this service-level information, the techniques may enable intermediate network devices along the SEP to adapt the SEP to accommodate changes in application of one or more services at the service node associated with the SEP.

In one embodiment, a method comprises receiving, with a service node of a network, traffic via a path configured within the network to direct the traffic from an ingress network device of the path to the service node, wherein the path includes filters that control admission of the traffic at the ingress network device to the path and applying, with the service node, one or more services to the traffic received via the path. The method also comprises generating, with the service node, service-specific information related to the application of the one or more services to the traffic by the service node and sending, with the service node, the service-specific information to at least one network device configured to forward the traffic along the path so that the at least one network device configured to forward the traffic along the path adapts the path based on the service-specific information.

In another embodiment, a service node comprises at least one interface that receives traffic via a path configured within a network to direct the traffic from an ingress network device of the path to the service node, wherein the path includes filters that control admission of the traffic at the ingress network device to the path, and a control unit that applies one or more services to the traffic received via the path and generates service-specific information related to the application of the one or more services to the traffic. The at least one interface sends the service-specific information to at least one network device configured to forward the traffic via the path so that the at least one network device configured to forward the traffic via the path is able to adapt the path based on the service-specific information.

In another embodiment, a non-transitory computer-readable medium comprises instructions that, when executed, cause one or more processors of a service node of a network to receive traffic via a path configured within the network to direct the traffic from an ingress network device of the path to the service node, wherein the path includes filters that control admission of the traffic at the ingress network device to the path, apply one or more services to the traffic received via the path, generate service-specific information related to the application of the one or more services to the traffic and send the service-specific information to at least one network device configured to forward the traffic via the path so that the at least one network device configured to forward the traffic via the path is able to adapt the path based on the service-specific information.

In another embodiment, a method comprises configuring a path in a control unit of a network device by which to forward traffic from an ingress network device to a service node based on configuration data specified by an orchestrating device that computes and configures paths through the network and that does not forward any traffic through the network other than that used to compute and configure the paths through the network and forwarding the traffic along the path with the configured control unit to enable the service node to apply one or more services to the traffic. The method also comprises receiving, with the network device, service-specific information related to the application of the one or more services by the service node to the traffic and re-configuring the path in the control unit of the network device based on the received service-specific information.

In another embodiment, a network device comprises a control unit configured to forward traffic along a path from an ingress network device to a service node in accordance with configuration data specified by an orchestrating device that computes and configures paths through the network and that does not forward any traffic through the network other than that used to compute and configure the paths through the network and at least one interface that forwards the traffic along the path to enable the service node to apply one or more services to the traffic and receives service-specific information related to the application of the one or more services by the service node to the traffic. The control unit re-configures the path based on the received service-specific information.

In another embodiment, a non-transitory computer-readable medium comprises instructions that, when executed, cause one or more processors of a network device to configure a path in a forwarding plane of the network device by which to forward traffic from an ingress network device to a service node based on configuration data specified by an orchestrating device that computes and configures paths through the network and that does not forward any traffic through the network other than that used to compute and configure the paths through the network, forward the traffic along the path with the configured forwarding plane to enable the service node to apply one or more services to the traffic, receive service-specific information related to the application of the one or more services by the service node to the traffic, re-configure the path in the forwarding plane of the network device based on the received service-specific information.

In another embodiment, a network system comprises a software-defined network and an orchestrating device that computes and configures paths through the software-defined network and that does not forward any traffic through the software-defined network other than that used to compute and configure the paths through the software-defined network. The software defined-network includes a service node and an ingress network device. The ingress network device comprises a control unit configured to forward traffic along a path from the ingress network device to the service node in accordance with configuration data specified by the orchestrating device and at least one interface that forwards the traffic along the path to enable the service node to apply one or more services to the traffic. The service node comprises at least one interface that receives the traffic via the path and a control unit that applies the one or more services to the traffic received via the path and generates service-specific information related to the application of the one or more services to the traffic. The at least one interface of the service node sends the service-specific information to at least one network device configured to forward the traffic via the path. The control unit of the ingress network device unit re-configures the path based on the received service-specific information.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
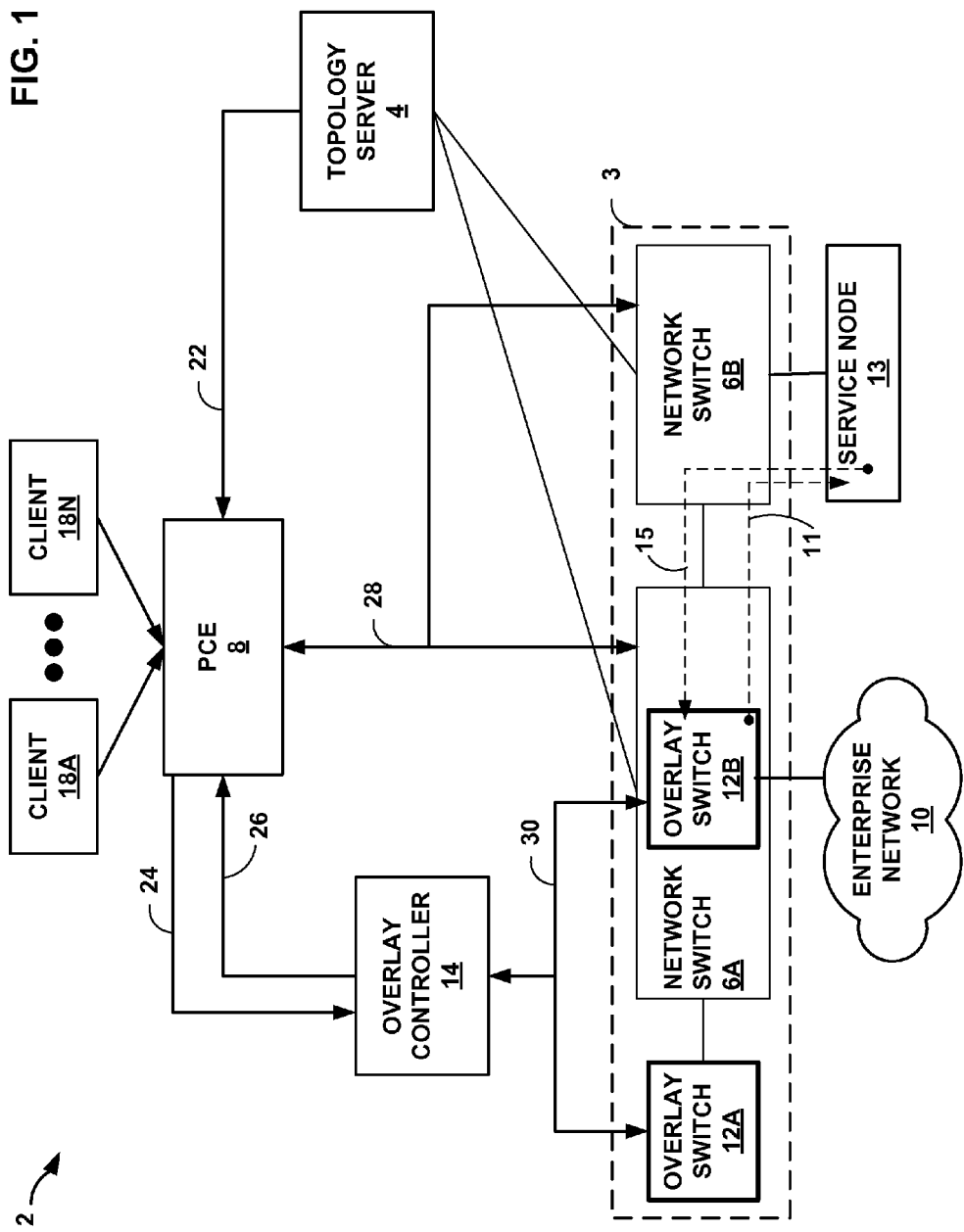
FIG. 1 is a block diagram illustrating an example network system for establishing requested paths through a multi-layer, multi-topology network that are adaptive to changes in service application using a feedback loop in accordance with techniques described herein.

FIG. 1 is a block diagram illustrating an example network system 2 for establishing requested paths through a multi-layer, multi-topology network that are adaptive to changes in service application using a feedback loop in accordance with techniques described herein. Network system 2 includes a multi-topology network 3 (hereinafter, "network 3") that includes multiple layers that transport traffic between networks, such as enterprise network 11, hosts or any other network or network device, such as service node 13.

Enterprise network 10 may represent a network owned and operated by an enterprise or business. Service node 13 may represent a service card or so-called "service blade" installed within or otherwise coupled to a network device (such as network switch 6B), a virtual network device executing within a network device, or a separate physical network device. In any event, service node 13 may apply one or more services to network traffic, such as Network Address Translation (NAT) or other firewall services, intrusion detection and prevention (IDP) services, anti-virus services, anti-malware services, parental control services, or any other type of service. While described with respect to enterprise network 10 establishing a path to service node 13, the techniques may generally be applied with respect to any two network entities, such as networks, service nodes, devices, etc., and should not be limited to the examples described in this disclosure.

In any event, a base network layer of network 3 (or "base network") includes network switches 6A, 6B (collectively, "network switches 6") arranged in a physical topology. Network switches 6 receive and forward packet data units (PDUs) for network flows according to forwarding information programmed into the switches by an administrator or external entity (e.g., overlay controller 14 or multi-topology path computation element 8) and/or according to forwarding information learned by the switches, whether by operation of one or more protocols (e.g., interior gateway protocols (IGPs)) or by recording information learned during PDU forwarding. Each of network switches 6 may represent a router, a layer three ("L3") switch, a layer three ("L2") switch, an L2/L3 switch, or another network device that switches traffic according to forwarding information. Accordingly, PDUs forwarded by network switches 6A may include, for example, L3 network packets (e.g., Internet Protocol) packets and/or L2 packets (e.g., Ethernet datagrams or Asynchronous Transfer Mode (ATM) cells). PDUs may be unicast, multicast, anycast, and/or broadcast.

An overlay network layer of network 3 includes overlay switches 12A, 12B (collectively, "overlay switches 12") arranged in a virtual topology "over" a physical topology defined by network switches 6. For example, each of network switches 6 may include a data plane and typical routing and/or switching protocols for controlling packet forwarding, but may also expose the data plane to other software installed on the device to control packet forwarding within this "overlay network" using propriety or third-party protocols. Individual links of the virtual topology of the overlay network (or "overlay links") may be established paths through the base network and/or physical links connecting overlay switches 12. The overlay network may represent a virtual private network (VPN), an OpenFlow network consisting of one or more OpenFlow switches, or an application-layer network with selection functionality built-in to endpoint devices, for example. Accordingly, each of overlay switches 12 may represent a router or routing instance (e.g., a virtual routing and forwarding (VRF) instance); a Virtual Private Local Area Network (LAN) Service (VPLS) instance; a dedicated L2, L3, or L2/L3 switch; or a virtual or "soft" switch (e.g., an OpenFlow switch) implemented by a router or by a dedicated switch, for example. Overlay switch 12A, for instance, represents a dedicated overlay switch, i.e., a physical switch that performs switching and/or routing in response to control plane software configured to control the data plane of the switch. Overlay switch 12B, in contrast, is implemented by network switch 6A and may represent, for instance, a soft switch that utilizes the underlying data plane of network switch 6A. Network 3 may include multiple overlay network layers of different or similar types (e.g., multiple VPNs and/or OpenFlow networks).

Topology server 4 receives topology information from network switches 6 for the base network of multi-topology network 3. For example, topology server 4 may execute one or more IGPs or Exterior Gateway Protocols (e.g., the Border Gateway Protocol (BGP)) to listen to routing protocol advertisements sent by network switches 6. Topology server 4 collects and stores the base network topology information, then provides the base network topology information to multi-topology path computation element (PCE) 8 in base topology update messages 22. Topology information may include traffic engineering information for the network links, such as the links' administrative attributes and bandwidth at various priority levels available for use by label-switched paths (LSPs). In some examples, network switches 6 may send topology update messages to topology server 4 that specify L2 link information for L2 links connecting the network switches. In some examples, topology server 4 is a component of PCE 8.

Overlay controller 14 receives topology information for the overlay network of multi-topology network 3 in topology update messages sent by overlay switches 12 in respective communication sessions 30. Topology update messages sent by overlay switches 12 may include virtual and physical switch port information, PDUs and associated metadata specifying respective ports and/or interfaces on which PDUs are received. In some examples, overlay controller 14 is a routing protocol listener that executes one or more routing protocols to receive routing protocol advertisements sent by overlay switches 12. Such routing protocol advertisements may be associated with one or more VRFs, for instance. Overlay controller 14 collects and stores the overlay topology information, then provides the overlay topology information to PCE 8 in overlay topology update messages 26. In some examples, overlay controller 14 is a component of PCE 8.

Network switches 6 may be configured to or otherwise be directed to establish paths through the base network of multi-topology network 3. Such paths may include, for instance, IP tunnels such as Generic Route Encapsulation (GRE) tunnels, General Packet Radio Service (GPRS) Tunneling Protocol (GTP) tunnels, LSPs, or a simple route through the base network or a VPN (identified by a static route with a route target, for instance). Network switches 6 provide path status information for paths established through the base network of multi-topology network to PCE 8 in communication sessions 28. Path status (alternatively, "path state" or "LSP state") information may include descriptors for existing, operational paths as well as indications that an established path or path setup operation has failed. For example, network switch 6A may attempt establish an LSP using a reservation protocol such as Resource reSerVation Protocol (RSVP) but fail due to insufficient network resources along a path specified by an Explicit Route Object (ERO). As a result, network switch 6A may provide an indication that the path setup operation failed to PCE 8 in a communication session 28. PCE 8 receives path status information and adds established paths through the base network of network 3 as links in the overlay network topology.

PCE 8 presents an interface by which clients 18A-18N (collectively, "clients 18") may request a dedicated path, often for a specific time, between any combination of network entities, such as enterprise network 10 and service node 13. Generally, clients 18 may request paths that conform to bandwidth, host, and time path parameters, quality of service (QoS) path request parameters, such as latency and jitter, and may further specify additional associated classifiers to identify a flow between the specified endpoints. Example flow classifiers (or "parameters") are provided below. Moreover, PCE 8 may present an interface by which client 18 may request services to be applied to network traffic originating from networks owned and operated by respective ones of clients 18.

PCE 8 uses base network topology information for network 3 received from topology server 4, overlay network topology information for network 3 received from overlay controller 14, and path status information received from network switches 6 to compute and schedule paths between network entities through network 3 that satisfy the parameters for the paths requested by clients 18. PCE 8 may receive multiple path requests from clients 18 that overlap in time. PCE 8 reconciles these requests by scheduling corresponding paths for the path requests that traverse different parts of network 3 and increase capacity utilization, for example, or by denying some of the path requests.

At the scheduled time for a scheduled path, PCE 8 installs forwarding information to network 3 nodes (e.g., overlay switches 12 and network switches 6) to cause the nodes to forward traffic in a manner that satisfies the requested path parameters. A requested path may traverse either or both domains of network 3. That is, a requested path may traverse either or both the base network and overlay network of multi-topology network 3. For example, a requested path for traffic may traverse only the base network domain as a simple network route, for instance, from network switch 6A to network switch 6B. However, some paths may traverse multiple domains. For example, any requested path for traffic between a network entity coupled to overlay switch 12B, such as enterprise network 10, and a network entity coupled to network switch 6B, such as service node 13, first traverses the overlay network domain and then traverses the base network domain.

PCE 8 installs forwarding information to overlay switches 12 using overlay controller 14. Overlay controller 14 presents a programming interface by which PCE 8 may add, delete, and modify forwarding information in overlay switches 12. Forwarding information of overlay switches 12 may include a flow table having one or more entries that specify field values for matching PDU properties and a set of forwarding actions to apply to matching PDUs. A set of one or more PDUs that match a particular flow entries represent a flow. Flows may be broadly classified using any parameter of a PDU, such as source and destination MAC and IP addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

PCE 8 invokes the programming interface of overlay controller 14 by sending overlay network path setup messages 24 directing overlay controller 14 to establish paths in the overlay network of network 3 and/or steer flows from hosts 13 onto established paths. Overlay controller 14 responds to overlay network path setup messages 24 by installing, to overlay switches 12 using communication sessions 30, forwarding information that implements the paths and/or directs flows received from hosts onto established paths.

PCE 8 installs forwarding information to network switches 6 using communication sessions 28. Each of network switches 6 may present a programming interface in the form of a management interface, configuration interface, and/or a path computation client (PCC). PCE 8 may invoke the programming interface of network switches 6 to configure a tunnel (e.g., an LSP), install static routes, configure a VPLS instance, configure an Integrated Routing and Bridging (IRB) interface, and to otherwise configure network switches 6 to forward packet flows in a specified manner. In some instances, PCE 8 directs one or more of networks switches 6 to signal a traffic engineered LSP (TE LSP) through the base network of network 3 to establish a path. In this way, PCE 8 may program a scheduled path through network 3 by invoking a programming interface of only the head network device for the path.

PCE 8 may, in some instances, remove a path, invoking the programming interfaces of network switches 6 and overlay switches 12 to remove forwarding information implementing the requested paths. In this way, PCE 8 frees resources for future paths.

Because PCE 8 has an enhanced view of the current state of the network 3 at both the overlay network layer and base network 3, PCE 8 may identify paths that are not visible to any one of network switches 6 or overlay switches 12 having a more limited view. PCE 8 may additionally, by virtue of having access to this enhanced view, steer traffic to underutilized portions of network 3 to increase capacity utilization of network 3. In addition, centralizing the path computation and establishment with PCE 8 may allow network operators to reconcile multiple, possibly conflicting application path requests and may reduce first-in-time, first-in-right access to network resources in favor of explicit, centralized prioritization of application requests for dedicated paths. More information regarding path computation and establishment, PCEs, OpenFlow and other aspects related to the formation of paths within network by external orchestrating or coordinating devices may be found in U.S. patent application Ser. No. 13/339,983, entitled "MULTI-TOPOLOGY RESOURCE SCHEDULING WITHIN A COMPUTER NETWORK," filed Dec. 29, 2011, the entire contents of which are hereby incorporated by reference.

To illustrate an example path configured for enterprise network 10, client 18A, which may represent a network administrator of enterprise network 10 or of a service provider network to which enterprise network 10 subscribes to gain access to a public network (e.g., the Internet), may establish a path 11 to service node 13 in response to enterprise 10 purchasing URL filtering services for enterprise network 10. Service node 13 may, in this example, represent a service node that performs a URL filtering service to filter uniform resource locators (URLs) based on the content associated with requested URLs. Service node 13 may advertise this URL filtering service to PCE 8 via a routing protocol message that includes service discovery information identifying the URL filtering service. More information concerning automated discovery of services in computer networks can be found in U.S. Application Ser. No. 13/534,140, entitled "AUTOMATED SERVICE DISCOVERY IN COMPUTER NETWORKS," filed Jun. 27, 2012, the entire contents of which are hereby incorporated by reference.

PCE 8 may identify service node 13 as providing the requested service and orchestrate path 11 from overlay switch 12B through switch 6B to the identified service node, i.e., service node 13 in this example. PCE 8 may orchestrate path 11 by first computing path 11 from overlay switch 12B through network switch 6B to service node 13 and then configuring overlay switches 12B and network switch 6B to support delivery of traffic from enterprise network 10 to service node 13 via path 11. PCE 8 may install filters that have admit and/or deny criteria for traffic entering path 11 via overlay switch 12B. In this example, PCE 8 may install filters associated with path 11 that only admit and/or deny traffic from enterprise network 10. The association of filters to control admission of traffic to path 11 effectively limits admission of traffic to application of parental control services performed by service node 13. As a result, these paths may be referred to as "service engineered paths" (which is commonly abbreviated as "SEP") in the sense that these paths are engineered to steer traffic in an efficient manner so that one or more services may be applied to this traffic. In this sense, path 11, in this example, is engineered to provide parental control services to traffic originated form enterprise network 10.

In this sense, PCE 8 acts as an orchestrating device and/or software driving network 3, which may be characterized as a "software-defined network" in the sense that PCE 8 performs path computation and directs configuration of the computed paths or SEPs rather than switches 6 and 12 themselves. That is, network 3 is configured externally via software executing on a device removed from network 3, i.e., PCE 8 in this example. In this respect, the orchestrating software may define these SEPs to suit a particular service in terms of defining filters tailored for that service. In the previous example, PCE 8 configured SEP 11 to promote utilization of service node 13. Typically, switches or other network devices, in order to provide a service, included a service node that directly coupled to the switches or other network devices that also coupled to the network entity requiring the service application. Thus, in the example of FIG. 1, the service provider would have updated overlay switch 12B to include a service blade or node that performs parental control services in response to enterprise network 10 requesting such services. However, using software-defined network 3, PCE 8 may configure SEP 11 to service node 13 coupled to network switch 6B (which is a different switch to which enterprise network 10 connects) thereby promoting increased utilization of service node 13 through service sharing.

While SEPs may provide for service sharing and enable other network devices to forward traffic via a path that meets the needs of the service application (e.g., in terms of quality of service (QoS) provided, bandwidth, etc.), SEPs may not generally be responsive to changes in the service application. In other words, SEPs may be configured to accommodate network conditions through provisioning of paths that meet certain network requirements (e.g., in terms of bandwidth, QoS, etc.), but may not be adapted to dynamically or automatically accommodate changes at the level of service application.

To illustrate, service node 13 may analyze traffic received via SEP 11 and determine that there are a number of requests for prohibited URLs, where service node 13 may drop packets requesting the prohibited URLs. The dropping of packets effectively wastes bandwidth reserved for SEP 11 considering that these packets could have been preemptively dropped during admission of these packets by overlay switch 12B. In this sense, service node 13 has determined that these packets requested specific URLs are to be dropped but may be unable to communicate this service-level information to overlay switch 12B. Overlay switch 12B, not aware of the service-level information, continually sends packets that are effectively "known" to be prohibited and therefore dropped by the parental control service via SEP 11, wasting bandwidth of SEP 11 and the computing resources of switches 6, 12B and service node 13.

In accordance with the techniques described in this disclosure, service node 13 may effectively establish a feedback loop 15 for communicating service-level information to $3^{rd}$ party control plane software executing on any network device along the SEP, such as the ingress to SEP 11 (i.e., overlay switch 12A in this example), a transit switch or node (i.e., network switch 6B in this example) intermediately positioned between the ingress network device and the service node or another service node (such as in examples where two service nodes are along a path and both perform services to the traffic). The techniques may enable service node 13 to communicate with the overlay network control plane software executing on switches 6, 12B along SEP 11 using, as one example, a routing protocol, such as an Intermediate System-to-Intermediate System (IS-IS) routing protocol, an open shortest path first (OSPF) routing protocol and a border gateway protocol (BGP). One or more of these routing protocols may comprise a link state or flooding routing protocol, such as the IS-IS routing protocol and the OSPF routing protocol. The service-level information may include any information related to a particular service provided by the service node. By providing this service-level information, the techniques may enable switches 6, 12B along SEP 11 to adapt SEP 11 to accommodate changes in application of one or more services at service node 13.

In operation, service node 13 receives traffic via SEP 11 configured within the network to direct the traffic from ingress switch 12B of the path to service node 13. As noted above, SEP 11 includes filters that control admission of the traffic at ingress switch 12B. Service node 13 may apply one or more of the above noted services to the traffic received via SEP 11 and generate service-specific information related to the application of the one or more services to the traffic. Service node 13 may then send the service-specific information to at least one network device configured to forward the traffic via SEP 11 (i.e., any one of switches 6, 12B in the example of FIG. 1, but commonly ingress switch 12A) so that any one of these switches 6, 12B along SEP 11 is able to adapt the path based on the service-specific information.

To illustrate, referring again to the URL filtering service, service node 13 may apply this URL filtering service to the traffic and identify URLs that are to be filtered, effectively dropping any packets requesting or providing content associated with this URL. Service node 13 may generate service-specific information identifying this URL and send the URL to switch 12B via feedback loop 15. Switch 12B may receive this service-specific information and update the filters associated with SEP 11 to block any traffic associated with the URL (which may be identified by a layer three address and a layer three port). In this respect, switch 12B may adapt SEP 11 to accommodate changes in application of the URL filtering service at service node 13.

Alternatively, as another example, service node 13 may specify flows to which the URL filtering service is not to subsequently applied. That is, service node 13 may inspect certain flows and determine that these flows are requesting or providing content associated with URLs that are acceptable. Service node 13 may then generate service-specific information identifying these flows and indicate that the service application may be by-passed for these flows. Service node 13 may send this service-specific information to ingress switch 12B via feedback loop 15, which may adapt SEP 11 based on this service-specific information by updating the filters associated with SEP 11 to indicate that traffic associated with these flows is to be sent to its intended destination and not pushed through SEP 11 to service node 13.

The techniques may also be applied with respect to a number of other services to facilitate service-level adaptation of SEPs, such as SEP 11. For example, service node 13 may apply one or more services to flows associated with a particular set of one or more virtual private networks (VPNs). The service, in this context, may be applied with respect to flows having a certain VPN membership scope corresponding to the set of VPNs. If service node 13 is informed or otherwise determines that this VPN membership scope has changed, meaning that one or more VPNs are added or removed from the set of VPNs, service node 13 may generate service-specific information identifying the change in VPN membership scope and send this information to ingress switch 12B via feedback loop 15. Ingress switch 12A may then adapt SEP 11 based on this service-specific information by updating the filters to accommodate the change in VPN membership scope such that traffic associated with the removed VPNs are not forwarded via SEP 11 and traffic associated with the new VPNs is forwarded via SEP 11.

Moreover, the service-specific information may include information defining execution results of the applied services and service state information between the at least one network device configured to forward the traffic along the path and the service node. The service state information may describe one or more of a current load and performance between the at least one network device configured to forward the traffic along the path and the service node. Service node 13 may pass this service-specific information to, for example, ingress switch 12B via feedback loop 15, which may use this information to performing load balancing or other operations so as to better distribute traffic to service nodes so that service nodes are not overloaded.

In this manner, service node 13 may establish feedback loop 15 so as to communicate service-specific information to one or more network devices that support SEP 11, i.e., switches 6 and 12B in the example of FIG. 1. As a result, these one or more network devices may adapt SEP 11 to accommodate changes in application of the service by service node 13. By enabling the adaptation of SEP 11 in this manner, the techniques may improve network performance (e.g., by not wasting bandwidth) and utilization (e.g., by load balancing traffic). While described above with respect to a number of different services and/or application, the SEP feedback loop techniques may generally enable any service-specific information to be passed back to one or more network devices that support the SEP. The techniques should therefore not be limited to the example services and service-specific information described in this disclosure.

Figure 2:
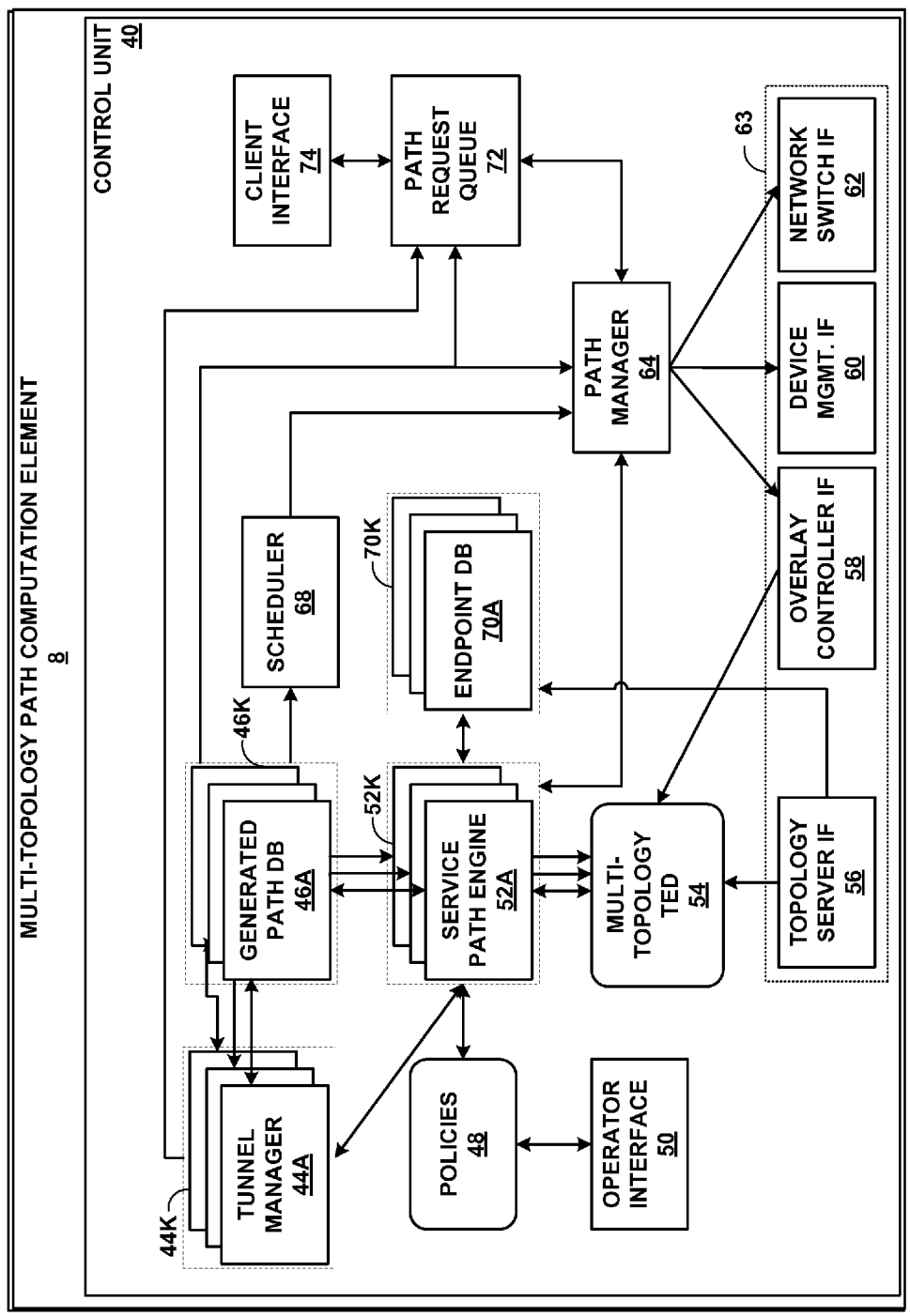
FIG. 2 is a block diagram illustrating an example path computation element that programs paths into a multi-topology network.

FIG. 2 is a block diagram illustrating an example path computation element that programs paths into a multi-topology network. Multi-topology path computation element 8, in this example, represents an example of PCE 8 for multi-topology network 80 of FIG. 2. As described with respect to FIG. 2, example multi-topology network 80 includes an L3 base network layer and an L2 overlay network layer.

PCE 8 includes a control unit 40 and a network interface (not shown) to exchange packets with other network devices. Control unit 40 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively or additionally, control unit 40 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Clients request paths through a network using client interface 74. In general, a path request includes a requested date/time, a required bandwidth or other constraint, and at least two endpoints. Client interface 74 may be a command line interface (CLI) or graphical user interface (GUI), for instance. Client 74 may also, or alternatively, provide an application programming interface (API), such as a web service. A user uses a client application to invoke client interface 74 to input path request parameters and submit the request to PCE 8. Client interface 74 receives path requests from clients and pushes the path requests to path request queue 72, a data structure that stores path requests for computation distribution by path manager 64.

To compute and schedule paths through a network intelligently, PCE 8 receives topology information describing available resources at multiple layers of the network. Topology server interface 56 (illustrated as "topology server IF 56") executed by control unit 40 of PCE 8 communicates with a topology server to receive topology information for a base network layer of the network, while overlay controller interface 58 communicates with an overlay controller to receive topology information for an overlay network layer of the network. Topology server interface 56 may include a routing protocol daemon that executes a routing protocol to receive routing protocol advertisements, such as Open Shortest Path First (OSPF) or Intermediate System-to-Intermediate System (IS-IS) link state advertisements (LSAs) or BGP UPDATE messages. Topology server interface 56 may in some instances be a passive listener that neither forwards nor originates routing protocol advertisements.

In this example, topology server interface 56 receives topology information that includes traffic engineering (TE) information. Topology server interface 56 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the domain. In some instances, topology server interface 56 executes Border Gateway Protocol to receive advertised TE information for inter-AS and other out-of-network links. Additional details regarding executing BGP to receive TE info are found in U.S. patent application Ser. No. 13/110,987, filed May 19, 2011 and entitled "DYNAMICALLY GENERATING APPLICATION-LAYER TRAFFIC OPTIMIZATION PROTOCOL MAPS," which is incorporated herein by reference in its entirety.

Topology server interface 56 may in some instances receive a digest of topology information collected by a topology server, rather than executing a routing protocol to receive routing protocol advertisements directly. Topology server interface 56 stores base network topology information with TE information in multi-topology traffic engineering database 54 (illustrated as "multi-topology TED 54," hereinafter "MT TED 54"), which is stored by a computer-readable storage medium of control unit 40 for use in path computation. MT TED 54 is described in further detail below.

Overlay controller interface 58 (illustrated as "overlay controller IF 58") represents a module that may implement a standardized interface, such as OpenFlow, to receive topology information from an overlay controller, such as an OpenFlow controller, that describes overlay network links connecting overlay switches. In general, overlay network links are not advertised by network switches (e.g., routers) of the base network for the overlay network and so will not be described by topology information received by topology server interface 56. An overlay controller augments the base network topology with overlay network topology links by providing overlay network topology information to overlay controller interface 58, which stores the overlay network topology information to MT TED 54. Overlay controller interface 58 may receive topology information for multiple different overlay networks, including VPNs and/or OpenFlow networks. Different overlay networks may require different instances of overlay controller interface 58 that communicate with network switches of the overlay network or with a topology server, for example, to receive overlay network topology information for respective overlay networks.

Multi-topology traffic engineering database 54 stores topology information for a base network layer and one or more overlay network layers of a network that constitutes a path computation domain for PCE 8. MT TED 54 may organize topology information for respective network layers hierarchically, with the base network topology information supporting the topology information for one or more overlay networks. Paths in a lower-layer topology may appear as links in a higher-layer topology. For example, tunnels (e.g., TE LSPs) created in the base network layer can appears as links in an overlay network TE topology. PCE 8 may then correlate overlay network links with paths established in the base network layer to efficiently compute paths that cross multiple overlay topologies. MT TED 54 may include one or more link-state databases (LSDBs), where link and node data is received in routing protocol advertisements, received from a topology server, and/or discovered by link-layer entities such as an overlay controller and then provided to PCE 8 via overlay controller interface 58. In some instances, an operator may configure traffic engineering or other topology information within MT TED 54 via operator interface 50.

Topology server interface 56 may also receive, from a topology server or by execution of routing protocols to receive routing protocol advertisements that include reachability information, endpoint information that describes endpoints reachable by specified nodes in any of the network topologies. Topology server interface 56 may receive endpoint information for a base layer of the network as well as for one or more services (e.g., VPNs) provided by the network that may correspond to overlay networks of the network. Endpoint information may associate network address prefixes with a nodes of the multi-topology network layers, where network address prefixes may be, e.g., IPv4 or IPv6. For example, topology server interface 56 may receive a BGP UPDATE message advertising a particular subnet as reachable from a particular node of the base network. As another example, topology server interface 56 may receive an Application-Layer Traffic Optimization (ALTO) map that includes PIDs associating respective nodes of a multi-topology network layer with network address prefixes reachable from the nodes. Endpoints that have network addresses that are members of the subnet are therefore reachable from the node, and PCE 8 may calculate paths for those endpoints to terminate (i.e., begin or end) at the node. Topology server interface 56 stores endpoint information received for a layer to a corresponding one of endpoint databases 70A-70K (illustrated as "endpoint DB 70A-70K" and collectively referred to as "endpoint databases 70"), where K refers to a number of layers of the multi-topology network that constitutes a path computation domain for PCE 8. Some of endpoint databases 70 may therefore be associated with respective service instances, e.g., respective VPNs that constitute overlay network layers of a multi-topology network. PCE 8 may therefore use endpoint databases 70 to locate and validate endpoints specified in path requests received from clients.

Each of service path engines 52A-52K (collectively, "SPEs 52") compute requested paths through a layer of the multi-topology network with which it is associated and for which it is responsible. Control unit 40 may execute multiple SPEs 52 concurrently, e.g., as separate processes. Each of SPEs 52 is associated with a corresponding one of generated path databases 46A-46K (illustrated as "generated path DB 46A-46K" and collectively referred to as "generated path databases 46"). Path manager 64 dequeues path requests from path request queue 72 and assigns path requests to SPEs 52 based on the layer of the multi-topology network in which the endpoints reside, as determined by path manager 64 from endpoint databases 70. That is, endpoints reachable by layers of a multi-topology network that is a path computation domain for PCE 8 are stored by at least one of endpoint databases 70, and path manager 64 determines the one or more endpoint databases 70 that include endpoints specified for a dequeued path request.

Paths are unidirectional. If a client requests a bidirectional path, path manager 64 triggers two path requests for the requested path—one for each direction. In some cases, a path may cross multiple layers of the network, e.g., at a gateway to the base layer that is implemented by one of the overlay network nodes or at a network node that participates in multiple overlay networks. In such cases, multiple SPEs 52 may cooperate to compute segments of the multi-layer path that path manager 64 stitches together at the gateway. Upon computing paths, SPEs 52 schedule the paths by storing the paths to respective generated path databases 46. A scheduled path stored in one of generated path databases 46 includes path information used by path manager 64 to establish the path in the network and may include scheduling information used by scheduler 68 to trigger path manager to establish the path. As described in further detail below, path scheduling may require locking generated path databases 46 to perform path validation prior to committing the path.

When a servicing path request received from path manager 64, an SPE 52 may initially validate the request by determining from endpoint databases 70 that the endpoints for the requested path, whether expressed as logical interfaces or network addresses, are known to PCE 8, i.e., exist within the path computation domain of PCE 8. SPE 52 may additionally validate flow classifiers to ensure that the flow classifiers specified for a requested path exist. If initial validation fails for either/both of these reasons, SPE 52 rejects the requested path and path manager 64 sends a path rejection message detailing the reasons to the requesting client via client interface 74.

To compute a requested path at a layer of a multi-topology network, a service path engine 52 for the layer uses MT TED 54 and the corresponding one of generated path databases 46 for the layer to determine whether there exists a path in the layer that satisfies the TE specifications for the requested path for the duration of the requested time. SPEs 52 may use the Djikstra constrained SPF (CSPF) and/or the Bhandari Edge disjoint shortest pair (for determining disjointed main and backup paths) path computation algorithms for identifying satisfactory paths though the multi-topology network. If a satisfactory computed path for the requested path exists, the computing service path engine 52 for the layer re-validates the computed path and, if validation is successful, schedules the computed path by adding the computed path to the one of generated path databases 46 for the layer. In addition, the computing one of SPE 52 adds the requested path start/complete times to scheduler 68 (if any). A computed path added to one of generated path databases 46 is referred to as a "scheduled" path, until such time as path manager 64 programs the scheduled path into the multi-topology network, whereupon the scheduled path becomes an "active" path. A scheduled or active path is a temporarily dedicated bandwidth channel for the scheduled time in which the path is, or is to become, operational to transport flows.

As noted above, generated path databases 46 store path information for scheduled and active paths. Path information may include an ERO that specifies a list of overlay or base network nodes for a TE LSP, routes or tunnels to be configured in one or more overlay network or base network nodes, forwarding information for overlay network nodes specifying respective sets of forwarding actions (which may also be referred to as "forwarding filters" or "filters") to apply to PDUs inbound to the overlay network nodes, and/or any other information usable by any of topology node interfaces 63 to establish and steer flows onto scheduled paths in a multi-topology network.

SPEs 52 compute scheduled paths based upon a current state (or "snapshot") of the multi-topology network, as represented by MT TED 54 and generated path databases 46. Because multiple SPEs 52 execute simultaneously, in this example, to compute and schedule paths through the multi-topology network, multiple SPEs 52 may attempt to update generated path databases 46 simultaneously, which could in some cases result in network resource oversubscription and failure by PCE 8 to satisfy requested paths. One of SPEs 52 may therefore, having computed a path, execute a transaction that conforms to the ACID properties (atomicity, consistency, isolation, durability) or another type of atomic transaction to both re-validate and update generated path databases 46 with a scheduled path. That is, the SPE 52 may first lock generated path databases 46 to prevent other SPEs 52 from modifying generated path databases 46. The SPE 52 may then validate the computed path against the locked generated path databases 46 as well as MT TED 54. If the computed path is valid, the SPE 52 updates generated path databases 46 by adding the computed path as a scheduled path. The SPE 52 then unlocks generated path databases 46. In this way, all affected links are updated in the same transaction, and subsequent path validations by other SPEs 52 account for the updates. SPEs 52 may use any suitable data structure locking mechanism, such as monitors, mutexes, or semaphores, to lock generated path databases 46.

If the SPE 52 fails to validate a previously computed path, the SPE 52 attempts to re-compute the path. Upon identifying a satisfactory path against the current snapshot of the multi-topology network, the SPE 52 again attempts to validate the computed path and update generated path databases 46.

In some cases, SPEs 52 may be unable to identify a path through an overlay network with which to satisfy a path request. This failure may be due to any of a number of factors. For example, sufficient network resources with which to satisfy the path request may be unavailable for the scheduled time due, for instance, to previously scheduled paths that include one or more links of the base network layer for any possible paths between the endpoints of the path request at an overlapping time. In this example, path computation fails. In other words, one or more paths between the endpoints of the path request exist, but the paths are already sufficiently subscribed to prevent the additional reservation of adequate resources for the requested path. As another example, SPEs 52 may be unable to identify any paths through an overlay network between the endpoints of the path request because the computation failed due to a missing link in the overlay network. In other words, the computed overlay network graph, after removing unusable edges unable to satisfy path request constraints, includes two disjoint subgraphs of the overlay network. However, in this case, a suitable path may be generated by creating a tunnel through the base layer between the subgraphs for the overlay network.

Where path computation fails because sufficient network resources do not exist at the requested time, the computing SPE 52 may consider policies 48, set by an operator via operator interface 50, that establish priorities among clients of PCE 8 and/or among path request parameters, including bandwidth, hosts, time, and QoS parameters as well as flow classifiers. A policy of policies 48 may prioritize the requested path for which path computation failed over and against one or more scheduled paths of generated path databases 46. In such instances, the computing SPE 52 may preempt one or more of these scheduled paths by removing (again, in accordance with policies 48) the paths from generated path databases 46 and scheduler 68. In addition, the computing SPE 52 in such instances enqueues the removed paths as path requests to path request queue 72. Components of PCE 8 may then again attempt to compute satisfactory paths for the path requests corresponding to paths removed from generated path databases 46. Where SPEs 52 are unable to identify a satisfactory path for such a path request, SPEs 52 direct path manager 64 to send a path rejection message to a requesting client that issued the path request via client interface 74. In effect, PCE 8 revokes a grant of scheduled multi-topology network resources made to the requesting client.

Where path computation fails due to a missing link between disjoint subgraphs of an overlay network each providing reachability to respective endpoints for a requested path, the computing SPE 52 requests one of tunnel managers 44A-44K (collectively, "tunnel managers 44") to establish a tunnel in a lower layer of the multi-topology network. For example, one of SPEs 52 for an overlay network may request a tunnel in a lower layer overlay network or in the base network layer. Each of tunnel managers 44 is associated with one of the layers of the multi-topology network and with one of generated path databases 46. In other words, each of tunnel managers 44 manages tunnels for one of the topologies.

Tunnel managers 44 operate as intermediaries between generated path databases 46 and SPEs 52. A higher layer SPE of SPEs 52 may request a lower layer one of tunnel managers 44 to establish a tunnel between two nodes of the lower layer to create a link in the higher layer. Because a tunnel traverses two layers of the multi-topology network, each of the two nodes may straddle the two layers by having an ingress and egress interface coupling the two layers. That is, a first one of the two nodes may be an ingress network switch having an ingress interface to the base network layer, while a second one of the two nodes may be an egress network switch having an egress interface from the base network layer. The tunnel manager 44, in response, may enqueue a path request specifying the two nodes in the lower layer of the multi-topology network to path request queue 72. If a lower layer SPE 52 is able to schedule a path for the path request, this path becomes a link in the lower layer generated path database 46, and the lower layer SPE 52 notifies the requesting one of tunnel managers 44 with link tunnel information for the link. The tunnel manager 44 propagates this tunnel information to MT TED 54, which triggers the higher layer SPE 52 that a new link is available in the higher layer topology and prompts the higher layer SPE to reattempt computing a satisfactory path for the original requested path. Tunnel managers 44 may also validate tunnel setup at their respective layer of a multi-topology network.

Scheduler 68 instigates path setup by tracking scheduled start times for scheduled paths in generated path databases 46 and triggering path manager 64 to establish the scheduled paths at their respective start times. Path manager 64 establishes each scheduled path using one or more of topology node interfaces 63 including overlay controller interface 58, device management interface 60, and network switch interface 62. Different instances of PCE 8 may have different combinations of topology node interfaces 63.

Path manager 64 may invoke the overlay controller interface 14 to sending overlay network path setup messages, e.g., overlay network path setup messages 24 of FIG. 1, directing an overlay controller to establish paths in an overlay network and/or steer flows from hosts onto established paths in accordance with path information for scheduled paths in generated path databases 46. In this way, PCE 8 may program paths according to a permanent virtual circuit (PVC) (or "hop-by-hop") model by programming forwarding state in network and/or overlay switches to execute the paths being programmed. As noted above, one or more of these paths may include filters that admit or deny traffic to the path. SPEs 52 may provide these filters to path manager 64, which may install these filters in the ingress switches.

Device management interface 60 may represent a Simple Network Management Protocol (SNMP) interface, a Device Management Interface (DMI), a CLI, or any other network device configuration interface. Path manager 64 may invoke device management interface 60 to configure network switches (e.g., routers) with static routes, TE LSPs, or other tunnels in accordance with path information for scheduled paths in generated path databases 46. Network switch interface 62 establishes communication sessions, such as communication sessions 28 of FIG. 1, with network switches to receive and install path state information and to receive path setup event information. Network switch interface 62 may be a PCE protocol (PCEP) interface, a DMI, or SNMP interface, for example.

Path manager 64 may invoke device management interface 60 and/or network switch interface 62 to configure and direct network switches to establish paths in a base network layer or overlay network layer of a multi-topology network. For example, path manager 64 may first configure a TE LSP within a network switch at a network edge, then direct the network switch to signal a path for the TE LSP using RSVP with traffic engineering extensions (RSVP-TE) or another signaling protocol. In this way, PCE 8 may program paths, including TE LSPs, into the network according to a soft PVC (SPVC) model. In this model, the network presents a programming interface that PCE 8 invokes to dynamically set up the SPVCs. In some examples, PCE 8 may use a combination of PVC and SPVC models to program paths into a multi-topology network.

Upon receiving confirmation from topology node interfaces 63 that a scheduled path setup is successful, path manager 64 transitions a status of the scheduled path in generated path databases 46 to "active." At the scheduled end time (if any) for an active path, scheduler 68 notifies path manager 64 to tear down the active path using topology node interfaces 63. After tearing down the path, path manager 64 removes the path from generated paths 46.

Figure 3:
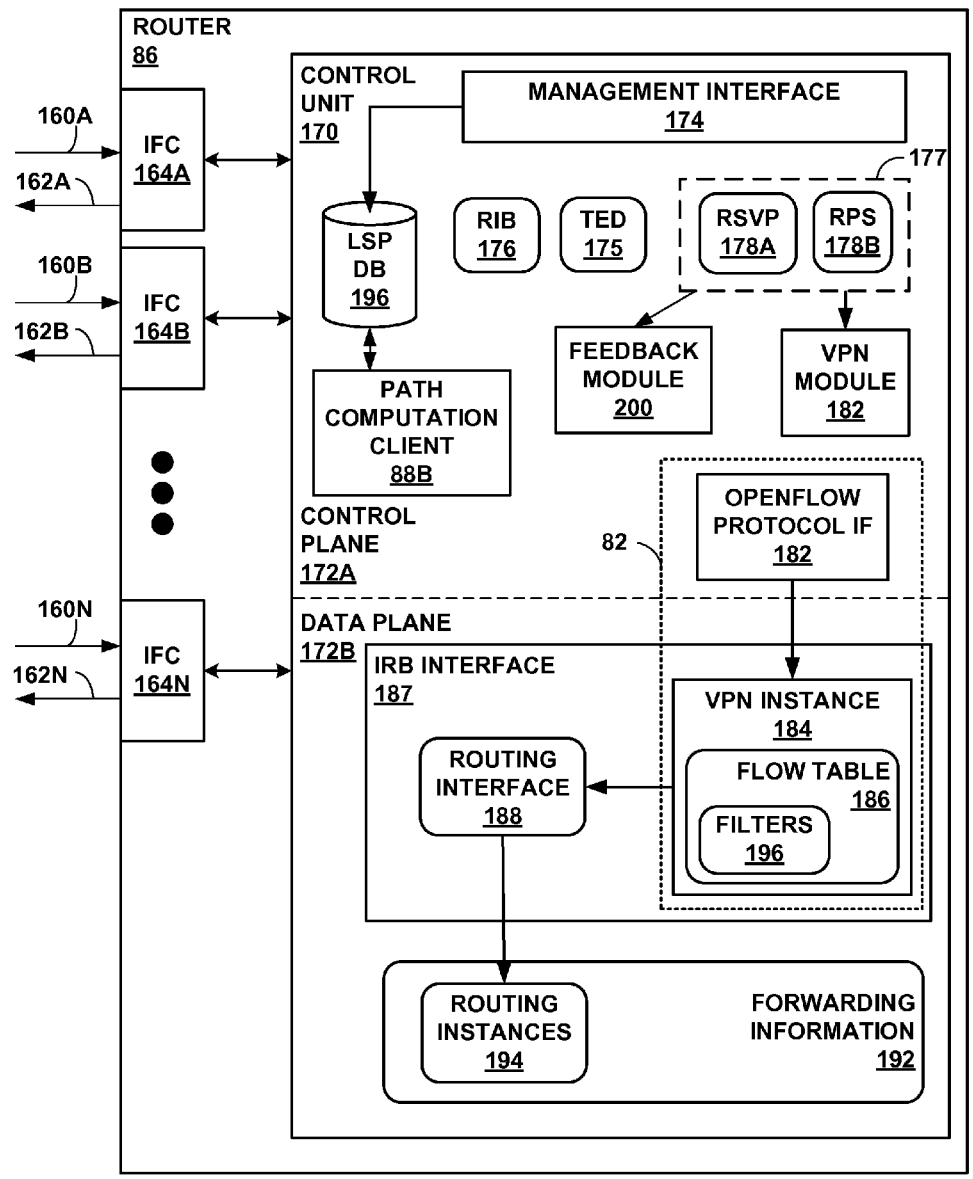
FIG. 3 is a block diagram illustrating an example router that receives service-related information from a service node via a feedback loop in accordance with techniques described herein.

FIG. 3 is a block diagram illustrating an example router that receives service-related information from a service node via a feedback loop in accordance with techniques described herein. For purposes of illustration, router 86 may be described below within the context of example multi-topology network system 2 of FIG. 1 and may represent any one of switches 6, 12. However, it is assumed for purposes of example that router 86 represents ingress switch 12A.

Some examples of router 86 may not include the full functionality described and illustrated. For instance, some examples of router 86 may include different combinations of PCC 88B, OpenFlow switch 82, and IRB interface 87, rather than all such components. Moreover, while described with respect to a particular network device, e.g., a router, aspects of the techniques may be implemented by any network device or combination of network devices. The techniques should therefore not be limited to the exemplary embodiments described in this disclosure.

Router 86 includes a control unit 170 and interface cards 164A-164N (collectively, "IFCs 164") coupled to control unit 170 via internal links. Control unit 170 may include one or more processors (not shown in FIG. 3) that execute software instructions, such as those used to define a software or computer program, stored to a computer-readable storage medium (again, not shown in FIG. 3), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 170 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 170 is divided into two logical or physical "planes" to include a first control or routing plane 172A ("control plane 172A") and a second data or forwarding plane 172B ("data plane 172B"). That is, control unit 170 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 172A of control unit 170 executes the routing functionality of router 86. In this respect, control plane 172A represents hardware or a combination of hardware and software of control unit 170 that implements routing protocols. In this example, routing protocol daemon (RPD) 177 is a process executed by control unit 170 that executes routing protocols 178B (illustrated as "RPs 178B") by which routing information stored in routing information base 176 ("RIB 176") and traffic engineering information stored in traffic engineering database 175 ("TED 175") may be determined. In addition, RPD 177 may establish peering sessions for one or more routing protocols 178B with another router, route reflector, or routing protocol listener (e.g., an application layer traffic optimization (ALTO) server) and send L3 topology and/or traffic engineering in RIB 176 and/or TED 175 to the peers.

Routing protocols 178B may include, for example, IGPs such as OSPF-TE or IS-IS-TE and/or exterior gateway protocols such as BGP-TE. RIB 176 and TED 175 may include information defining a topology of a network, such as the base network layer of multi-topology network 3 of FIG. 1. Routing protocol daemon 177 may resolve the topology defined by routing information in RIB 176 to select or determine one or more routes through the network. Control plane 172A may then update data plane 172B with these routes, where data plane 172B maintains these routes as forwarding information 192.

Forwarding or data plane 172B represents hardware or a combination of hardware and software of control unit 170 that forwards network traffic in accordance with forwarding information 192. RIB 176 may in some aspects comprise one or more routing instances implemented by router 86, with each instance including a separate routing table and other routing information. Control plane 172A in such aspects updates forwarding information 192 with forwarding information for each of routing instances 194. In this respect, routing instances 194 each include separate forwarding information for use by data plane 172B in forwarding traffic in accordance with the corresponding routing instance. Further details of one example embodiment of a router can be found in U.S. patent application Ser. No. 12/182,619, filed Jul. 30, 2008, and entitled "STREAMLINED PACKET FORWARDING USING DYNAMIC FILTERS FOR ROUTING AND SECURITY IN A SHARED FORWARDING PLANE," which is incorporated herein by reference.

Control plane 172A further includes management interface 174 by which a network management system or, in some instances an, administrator using a command line or graphical user interface, configures in VPN module 182 one or more VPN instances for a network to interconnect combinations of L2 networks into a single Ethernet domain. For example, an administrator may configure router 86 as a participant in a particular VPN instance, such as VPN instance 184. VPN module 182 may perform auto-discovery or other techniques to determine additional routers participating in a VPN instance and additionally performing signaling techniques to establish a full mesh of pseudowires between router 86 and each of the additional routers.

Data plane 172B includes one or more forwarding units, such as packet forwarding engines ("PFEs"), that provide high-speed forwarding of network traffic received by interface cards 164 via inbound links 160A-160N to outbound links 162A-162N. Integrated routing and bridging interface 187 ("IRB interface 187") of data plane 172B processes and forwards network traffic received on interfaces associated with the IRB interface 187. An administrator may configure IRB interface 187 via management interface 174 to map routing interface 188 of IRB interface 187 to one of routing instances 194 of router 86. Routing interface 188 may represent a next hop or other reference of a logical interface (IFL) of IRB interface 187, for example. In some embodiments, aspects of data plane 172B are distributed to a number of distributed forwarding units, such as packet forwarding engines, each associated with a different one or more IFCs 164. In these embodiments, IRB interface 187 may be may be distributed to the distributed forwarding units to enable high-speed integrated routing and bridging within the data plane.

Router 86 implements VPN instance 184 associated with IRB interface 187 to operate as a virtual switch to interconnect multiple L2 networks. VPN instance 184 maps a gateway L2 address (e.g., a gateway MAC address) to routing interface 188, which maps to one of routing instances 194. In this respect, the gateway L2 address maps to the routing instance. IRB interface 187 classifies L2 PDUs received on an interface associated with VPN instance 62 and destined for a gateway L2 addresses of VPN instance 184 as L3 packets for routing using the one of routing instances 194 mapped to routing interface 188. In other words, when router 86 receives an L2 PDU on an interface associated with VPN instance 184, IRB interface 187 determines the destination L2 address of the L2 PDU. When the destination L2 address matches the gateway L2 address mapped to routing interface 188, IRB interface 187 classifies the L2 PDU as an L3 packet and provides the L2 PDU to the mapped one of routing instances 194 for L3 forwarding by data plane 172B. IRB interface 87 may decapsulate the L2 PDU of the L2 header and footer. When a destination L2 address of an L2 PDU does not match the gateway L2 address, VPN instance 184 may switch the L2 PDU according to a matching flow entry of flow table 186. As a result, router 86 may operate as a gateway between an L2 overlay network layer and an L3 base network layer of multi-topology network 3. In some instances, IRB interface 187 performs a prior logical operation to classify L2 PDU as either routing traffic or bridging traffic, and then bridges the traffic or provides the traffic to a routing interface based on the result of classification.

Router 86 implements OpenFlow switch 82 to control switching of L2 PDUs among the set of virtual and/or physical interfaces of router 86 that are associated with VPN instance 184. Such interfaces may include attachment circuits for attaching L2 networks to VPN instance 184. OpenFlow protocol interface (IF) 182 of control plane 172A establishes an OpenFlow protocol session with an OpenFlow controller to provide L2 topology information and to receive forwarding information. OpenFlow protocol IF 183 installs flow entries received in the OpenFlow protocol session to flow table 186 to direct forwarding of PDUs received on interfaces associated with the VPN instance 184. In some instances, VPN instance 184 includes a L2 learning table and performs L2 learning with respect to interfaces of router 86 associated with VPN instance 184.

A network management system or, in some instances, an administrator using a command line or graphical user interface may invoke management interface 174 to configure label switched paths described in LSP database 196 (illustrated as "LSP DB 196"). LSP database 196 includes LSP configuration data, for example, an LSP destination, path (e.g., a Reported Route Object), and LSP attributes such as setup priority and hold priority, number of hops, the reserved bandwidth, and/or a metric that has been optimized for the LSP (e.g., an IGP metric, a TE metric, or hop counts). LSP database 196 may also include information designating zero or more attributes of each configured LSP as delegable parameters that may be set/modified by a PCE using extended PCEP to modify the operation of the LSP when set up in the network. LSP attributes may be divided into three categories: (1) non-delegable parameters that RPD 177 applies immediately using RSVP 178A and that are neither re-signalled nor overridden by a PCE, (2) delegable parameters that RPD 177 applies when the LSP is re-signaled due, e.g., to LSP failure, and (3) delegable parameters that may be overridden by a PCE and trigger re-signaling by RPD 177. All delegable LSP parameters may include a configured default value that RPD 177 applies when, for example, a PCEP session terminates, the PCE otherwise becomes unavailable, or the PCE returns a delegation.

RPD 177 sets up LSP described in LSP database 196 by executing a resource reservation protocol, which in this instance is RSVP 178B, that signals other routers in the network to reserve resources and provide MPLS forwarding information to RPD 177 for use in forwarding MPLS packets. Various instances of router 86 may also, or alternatively, use RSVP-TE or another Label Distribution Protocol (LDP) to signal LSPs. In addition, RPD 177 executes RPs 178B to receive traffic engineering information that affects the state of LSPs, such as failed links and preempted resources that may result in a down state for LSPs. RPD 177 may associate such LSP state information with corresponding LSPs in LSP database 196 and may further directs path computation client 88B to send one or more LSP state reports to a PCE in response, as described in further detail below.

Path computation client (PCC) 88B of control plane 172A mediates communication between RPD 177 and a path computation element (e.g., PCE 8 of FIG. 1 or FIG. 3). PCC 88B includes a PCE interface (not shown) that implements PCE communication protocol (PCEP) extensions to receive and send extended PCEP messages. The PCE interface also implements functionality for the operation of conventional PCEP, such as path computation request/reply messages.

Path computation client 88B establishes extended PCEP sessions with a PCE and sends, via the extended PCEP sessions, LSP state reports that include up-to-date LSP state for LSPs described in LSP state information. LSP state reports may be included in PCRpt messages. In this way, PCC 88B maintains strict LSP state synchronization between router 86 and the PCE, which the PCE may use when computing paths for an overlay network that make use of the LSPs.

In addition, PCC 88B may advertise router 86 as allowing modification of delegable parameters. As a result, LSP state reports sent by PCC 88B may in some case include a delegation that provides access rights to a PCE to modify parameters of the target LSP. In some instances, the delegation may specify the particular parameters of the target LSP that are exposed for modification. PCC 88B may, after delegating LSPs, receive LSP update requests that specify LSP parameter modifications for one or more of the LSPs. LSP update requests may be included in PCUpd messages. PCC 88B, in response, notifies RPD 177 of new parameters for target LSPs identified in LSP update requests. RPD 177 may re-signal the target LSPs, in turn, and as new LSPs are established, switch traffic over to the new LSPs and send a notification to PCC 88B that the new LSPs have been successfully signaled. PCC 88B provides this updated LSP state in LSP status reports to a PCE with which router 86 has extended PCEP sessions. Router 86 thus extends existing RSVP-TE functionality with an extended PCEP protocol that enables a PCE to set parameters for a TE LSP configured within the router. In this way, router 86 may implement an SPVC-like model to allow a PCE to signal computed paths through a multi-topology network, thereby dynamically setting up end-to-end paths as requested by clients.

For example, PCE 8 may configure router 86 to forward traffic along a path from an ingress network device, e.g., router 86 in this example, to a service node, such as service node 13, in accordance with configuration data specified by PCE 8, which may represent an external orchestrating device that computes and configures paths through the network and that does not forward any traffic through the network other than that used to compute and configure the paths through the network. The configuration data may be stored to various databases, such as RIB 176, TED 175, and LSP DB 196 to provide a few examples. The configuration data may define filters and other parameters that admit or deny traffic to path 11, as described above. These filters may then be installed in flow table 186 of VPN instance 184 as filters 196. Filters 196 may be associated with individual entries or may represent catch-all filters to be applied for making classification decisions as noted above. In this sense, flow table 186 may represent a collection of filters for making decisions with respect to flows as to whether to admit or deny flows to VPN instance 184. Data plane 172B, which includes at least one interface (e.g., IFCs 164), then forwards the traffic along path 11 to enable the service node to apply one or more services to the traffic.

While not shown explicitly in the example of FIG. 3, router 86 may also function outside of the context of a software-defined network, where RPS 178B may receive routing protocol messages, such as IS-IS messages, OSPF messages, and/or BGP messages to provide a few examples. These messages may include routing information regarding the state of various links and/or paths through network 3. RPS 178B may parse this routing information from the messages and store the routing information to RIB 176. RPS 178B may then resolve the routing information, including any routing information received via the routing protocol messages, to generate forwarding information for one or more routing instances. RPS 178B may then install this forwarding information as one or more routing instances 194. Data plane 172B may receive packets corresponding to these non-software-defined network routing instances (as represented by one or more of routing instances 194) and forward these packets in accordance with these ones of routing instances 194. Thus, while described above as performing aspects related to the configuration and operation of a path in a software-defined network, router 86 may also operate according to standard routing protocols, where router 86 resolves routing information itself and configure one or more routing instances 194 of forwarding information 192 (as opposed to an orchestrating device external from router 86 configuring one or more of routing instances 194).

Figure 4:
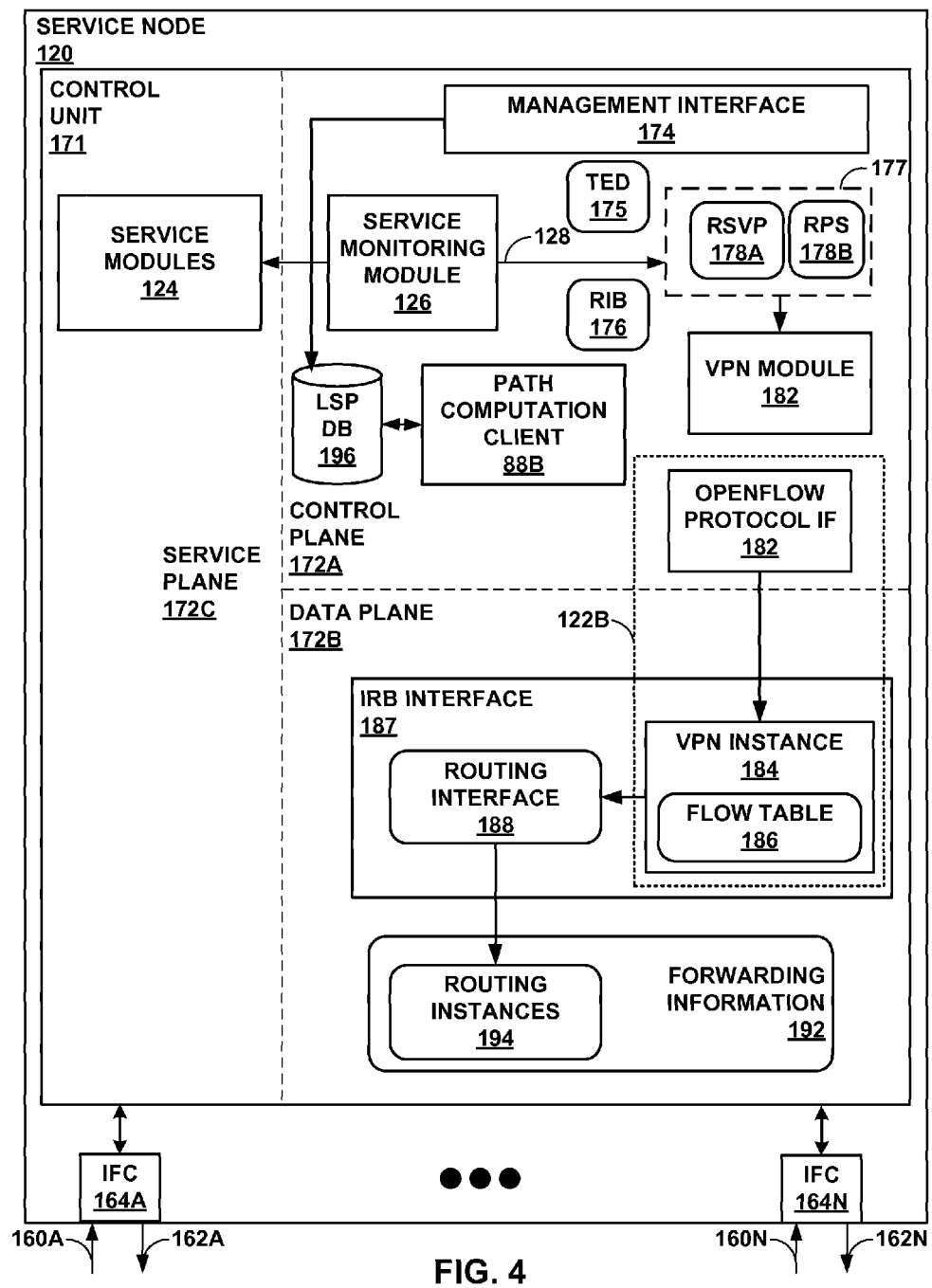
FIG. 4 is a block diagram illustrating an example service node that forms a feedback loop for a service engineered path in accordance the techniques described in this disclosure.

FIG. 4 is a block diagram illustrating an example service node 120 that forms a feedback loop for a service engineered path in accordance the techniques described in this disclosure. For purposes of illustration, service node 120 may be described below within the context of example multi-topology network system 2 of FIG. 1. Service node 120 may represent a more detailed example of service node 13 of FIG. 1. In some examples, service node 120 may represent a stand-alone network device, as shown in the example of FIG. 1. Service node 120 is assumed, in the description below, to represent a router that is capable of performing one or more services to network traffic. Service node 120 may include many components, modules or units that are similar, if not substantially similar, to those described above with respect to router 86. Accordingly, similar modules to those described above with respect to router 86 are labeled or denoted with the same numbers to reflect this similarity.

Some examples of service node 120 may not include the full functionality described and illustrated. For instance, some examples of service node 120 may include different combinations of PCC 88B, OpenFlow switch 86B, and IRB interface 87, rather than all such components. Moreover, while described with respect to a particular network device, e.g., a router, aspects of the techniques may be implemented by any network device or combination of network devices. The techniques should therefore not be limited to the exemplary embodiments described in this disclosure.

Service node 120 includes a control unit 171 and interface cards 164A-164N (collectively, "IFCs 164") coupled to control unit 171 via internal links. Control unit 171 may include, similar to control unit 170 of router 86, one or more processors (not shown in FIG. 4) that execute software instructions, such as those used to define a software or computer program, stored to a computer-readable storage medium (again, not shown in FIG. 4), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 171 may, again similar to control unit 170 of router 86, comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example and different from router 86 described above with respect to the example of FIG. 3, control unit 171 is divided into three logical or physical "planes" to include a first control or routing plane 172A ("control plane 172A"), a second data or forwarding plane 172B ("data plane 172B") and a third service plane 172C. That is, control unit 171 implements three separate functionalities, e.g., the routing/control, forwarding/data and service functionalities, either logically, e.g., as separate software instances executing on the same set of hardware components, or physically, e.g., as separate physical dedicated hardware components that either statically implement the functionality in hardware or dynamically execute software or a computer program to implement the functionality.

Service plane 172C executes or otherwise provides one or more service modules 124. Service modules 124 may each perform the same service or different services, depending on the configuration of service plane 172C. These services may include a firewall service, a NAT service, an IDP service, an URL filtering service, an encryption service, and any other type of service that may be performed in a network. In accordance with the techniques described in this disclosure, control plane 172A includes a service monitoring module 126 that monitors these service modules 124, identifying changes to service state (such as a change in the URL being filtered or allowed, change in VPN membership scope, etc.). Service monitoring module 126 may also monitor execution of service modules 124 to determine whether any of these service modules 124 are reaching processing and/or memory thresholds. Service monitoring module 126 may, therefore, generally monitor service modules 124 to identify service-specific information 128 related to the application of one or more services by service modules 124.

When monitoring service modules 124, service monitoring module 126 may determine which service modules 124 are servicing traffic associated with different established SEPs. That is, one or more of service modules 124 may be mapped to one or more of the SEPs. Service monitoring module 126 may perform lookups in RIB 176 to identify these mappings or otherwise query routing protocol daemon 177 and/or management interface 174 (which may store configuration data) to identify these mappings. Service monitoring module 126 may then determine service-specific information on a per SEP basis by monitoring specific ones of service modules 124 associated with SEPs. Service monitoring module 126 may then generate service-specific information 128 that identifies applications of services to traffic associated with a particular SEP. Service monitoring module 126 may generate service-specific information 128 such that this information 128 identifying the SEP to which the corresponding service information corresponds.

Upon determining or otherwise generating this service-specific information 128, service monitoring module 126 may then pass this information 128 to routing protocol daemon 177, which may invoke one or more of RPS 178B. The invoked one or more of RPS 178B may process the service-specific information, generating a routing protocol message that includes this service-specific information. The invoked one or more of RPS 178B may then forward (often flooding these messages) to other routers and/or switches that also implement the corresponding routing protocol, thereby effectively creating a path-specific feedback loop, e.g., feedback loop 15, to any device that supports the corresponding path.

Referring back to the example of FIG. 3, router 86 may receive this routing protocol message via a corresponding one of RPS 178B and parse the service-specific information. RPS 178B may inspect the service-specific information to determine whether router 86 is associated with a SEP to which the service-specific information corresponds. Assuming the service-specific information corresponds to SEP 11 operating over VPN instance 184, the corresponding one of RPS 178B passes the service-specific information (which may also be referred to as "feedback") to feedback module 200 executing within control unit 120. Feedback module 200 may process the service-specific information and interface with VPN module 182, path computation client 88B, OpenFlow protocol IF 183, RIB 176 and/or TED 175 to adapt SEP 11 based on the received service-specific information.

To illustrate, feedback module 200 may receive service-specific information defining filter by-pass states for various flows sent via SEP 11 operating over VPN instance 184 to service node 120 (which again may represent a more detailed example of service node 13 shown in the example of FIG. 1). Feedback module 200 may interface with VPN module 182 to configure filter 196 of VPN instance 184 so as to redirect these by-pass flows to their intended destination rather than to send these flows via VPN instance 184 over SEP 11 to service node 120.

As another example, feedback module 200 may receive service-specific information identifying a change in VPN membership scope and, in response, interface with VPN module 182 to update VPN instance 184 to adapt SEP 11, and more specifically, filters 196 to add or remove flows from VPN instance 184.

As yet another example, feedback module 200 may receive service-specific information indicating some operational constraint on application of the service to flows being sent via SEP 11. These operational constraints may comprise a lack of physical resources to process these flows, such as processor capacity or memory resources. The operational constraints may also comprise limits imposed on the operation of service node 120, such as a maximum number of flows that service node 120 may be permitted to process concurrently. In any event, feedback module 200 may be configured to interface with path computation client 88B and/or OpenFlow protocol IF 183 to request from PCE 8 that a new path be established to another service node that performs a same or similar service as that performed by service node 120. In some instances, feedback module 200 may query an ALTO server to identify this other service node that performs the same or similar service as that performed by service node 120. Upon receiving the network identifier (e.g., IP address) for this other service node, feedback module 200 may interface with path computation client 88B and/or OpenFlow protocol IF 183 to request a new SEP to this other service node identified by the network identifier. Once this new path is configured in the manner described above, feedback module 200 may redirect one or more of the flows via this new SEP to the other service node, updating filters 196 and filters associated with the other SEP to implement this redirection of flows. Feedback module 200 may continue to receive service-related information from service node 120 and may redirect flows until the operational conditions at service node 120 are alleviated or within threshold levels.

In this sense, feedback module 200 may adapt SEP 11 to accommodate changing service-level conditions occurring at service node 120. By enabling adaption of SEP 11, the techniques may promote more efficient network operation, enabling more efficient bandwidth usage and potentially load-balancing based on service-level conditions in addition to network-level conditions rather than strictly on network-level conditions.

While described above with respect to an ingress router 86 to SEP 11 and a service node, in many instances, the techniques may be deployed such that feedback loop has multiple termination points. That is, feedback loop 15 may not necessarily terminate with ingress overlay switch 12B of SEP 11, but any network devices positioned between ingress overlay switch 12B and service node 13 may receive and respond to service-specific feedback information. One example may be where two or more service nodes are daisy chained together, with the first service node applying a first service and the second service node applying a second service. This second service may be different that the first service. To illustrate, the first service may comprise a firewall service while the second service may comprise an IDP service. The second IDP service node may apply the IDP service and determine that one or more flows are "malicious" and should be dropped. The second IDP service node may utilize a feedback loop similar to feedback loop 15 to communicate that these malicious flows should be dropped. The first firewall service node may then block these malicious flows at the firewall and possibly identify any derivative flows associated with the source address of the infected packets that should also be blocked. Additionally, this feedback loop may extend back to the ingress device of the SEP, which may also utilize this information to discard the particular malicious flows. Accordingly, the techniques should not be limited to the examples provided above, but may be implemented such that feedback loop 15 provides feedback to any device that supports a SEP to which this feedback corresponds.

Moreover, while not shown explicitly in the example of FIG. 4, service node 120 may also function outside of the context of a software-defined network, where RPS 178B may receive routing protocol messages, such as IS-IS messages, OSPF messages, and/or BGP messages to provide a few examples. These messages may include routing information regarding the state of various links and/or paths through network 3. RPS 178B may parse this routing information from the messages and store the routing information to RIB 176. RPS 178B may then resolve the routing information, including any routing information received via the routing protocol messages, to generate forwarding information for one or more routing instances. RPS 178B may then install this forwarding information as one or more routing instances 194. Data plane 172B may receive packets corresponding to these non-software-defined network routing instances (as represented by one or more of routing instances 194) and forward these packets in accordance with these ones of routing instances 194. Thus, while described above as performing aspects related to the configuration and operation of a path in a software-defined network, router 86 may also operate according to standard routing protocols, where router 86 resolves routing information itself and configure one or more routing instances 194 of forwarding information 192 (as opposed to an orchestrating device external from router 86 configuring one or more of routing instances 194).

Figure 5:
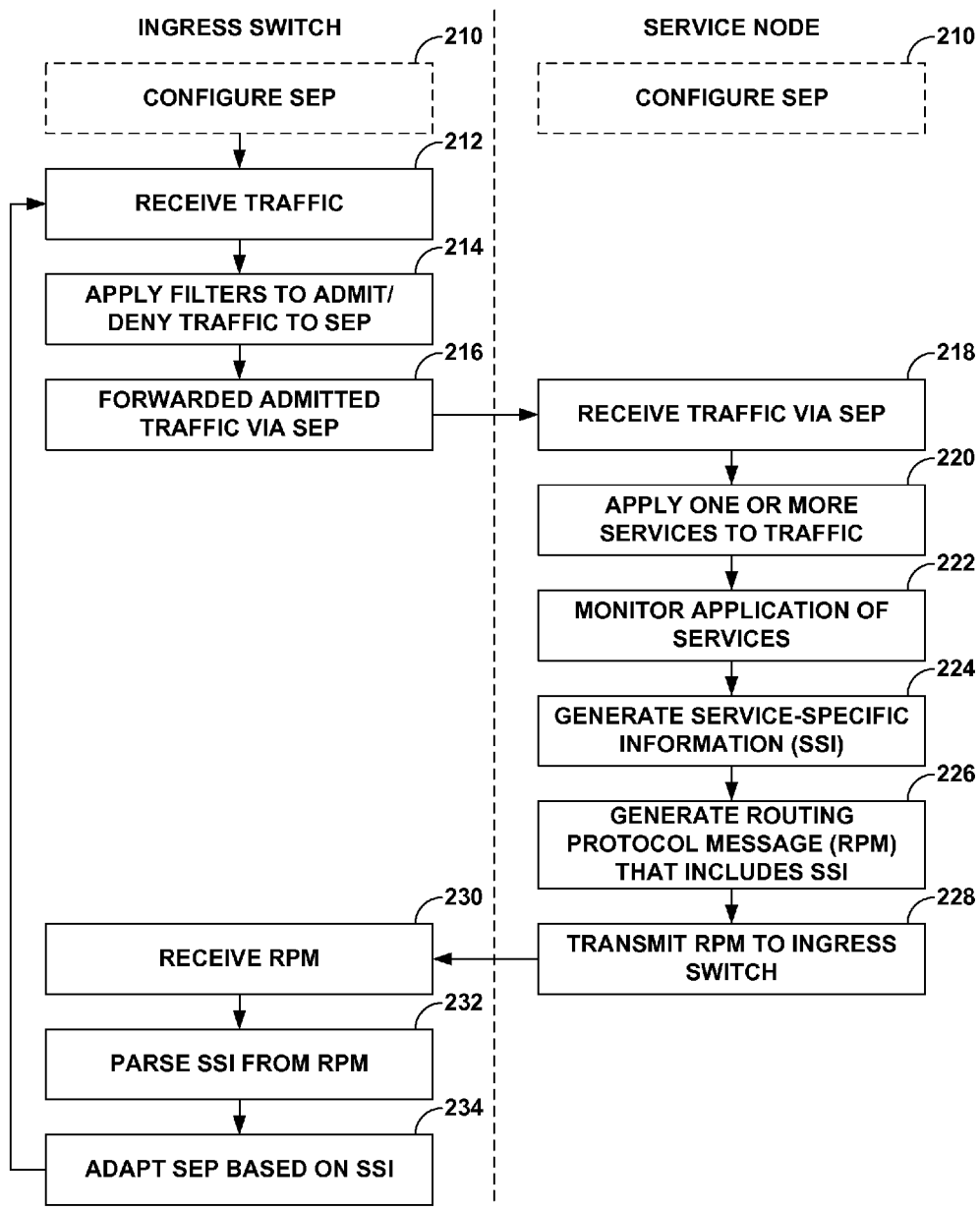
FIG. 5 is flowchart illustrating exemplary operation of an ingress network device and a service node in performing different aspects of the service engineered path (SEP) feedback loop techniques described in this disclosure.

FIG. 5 is flowchart illustrating exemplary operation of an ingress network device, such as router 86 of FIG. 3, and a service node, such as service node 120 of FIG. 4, in performing different aspects of the service engineered path (SEP) feedback loop techniques described in this disclosure. Initially, one or more orchestrating devices, such as PCE 8 and/or overlay controller 14 shown in the examples of FIGS. 1, 2, may configure a SEP, such as SEP 11 shown in the example of FIG. 1, through network 3. To configure SEP 11, PCE 8 interfaces with ingress overlay switch 12B (represented by router 86), network switch 6B and service node 13 (represented by service node 120) and install forwarding information within the respective forwarding or data planes 172B of each of switch 12B, switch 6B and service node 13. In this way, ingress switch 12B and service node 13 may be configured to forward and receive traffic via SEP 11 (210; where step 210 is dash-lined to reflect that this step may be performed as an initial step with respect to both ingress switch 12B and service node 13).

In any event, once configured, router 86 may receive traffic via IFCs 164, where IRB interface 187 may apply filters 196 to admit or deny traffic to SEP 11 and forward any admitted traffic via SEP 11 to service node 120 in the manner described above (212-216). Service node 120 receives the traffic via SEP 11 and invokes one or more of service module 124 to apply one or more services to the traffic received via SEP 11 (218, 220). Service monitoring module 126 executing on control unit 171 of service node 120 may monitor the application of the one or more services to the traffic, generating service-specific information in the manner described above (222, 224). Service monitoring module 126 may pass the service-specific information to RPs 178B executing on control unit 171 of service node 120, which may generate a routing protocol message that includes the service-specific information (226). RPs 178B may forward (often, by "flooding") the routing protocol message to the ingress network switch, i.e., router 86 in this example (228).

Router 86 receives the routing protocol message and parses the service-specific information from the routing protocol message (230, 232). Router 86 may invoke feedback module 200 to determine whether this service-specific information corresponds to a SEP for which router 86 has been configured to forward traffic. Assuming for purposes of illustration that this service-specific information corresponds to SEP 11, feedback module 200 may adapt SEP 11 based on the service-specific information in any of the number of ways described above (234).

Figure 6:
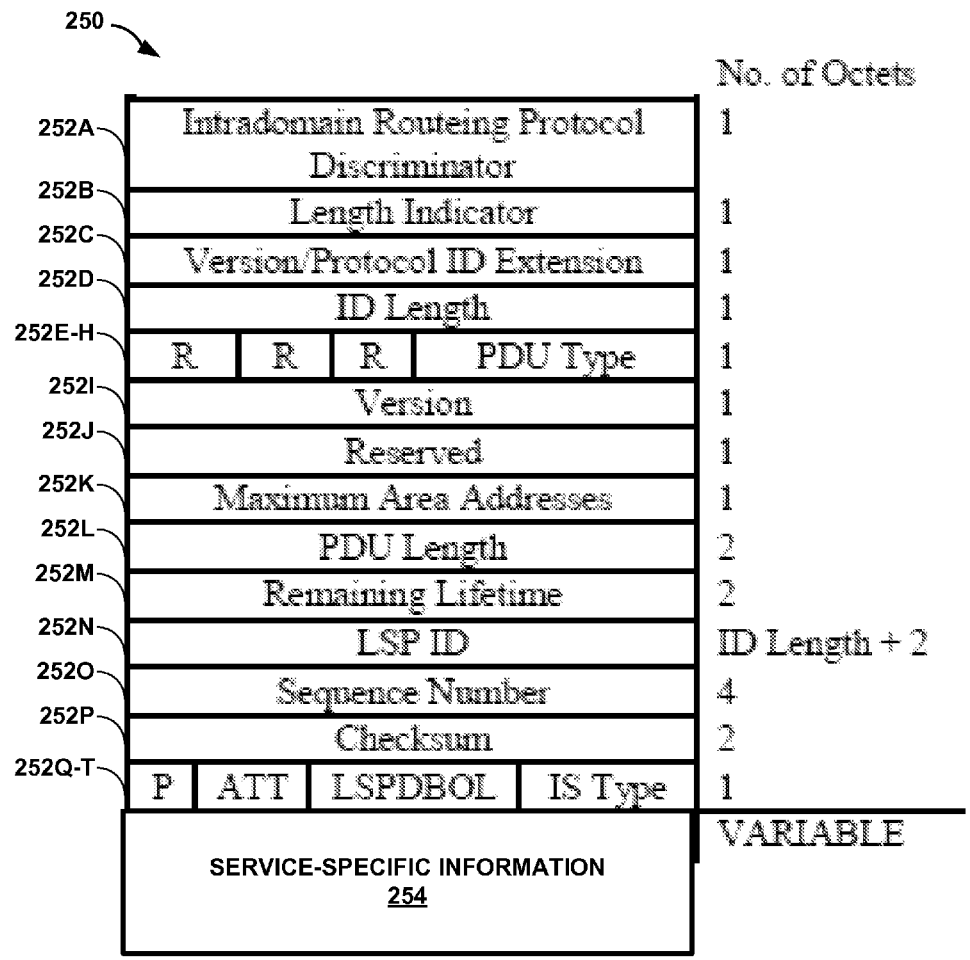
FIG. 6 is a diagram illustrating an exemplary Intermediate System-to Intermediate System (IS-IS) routing protocol message that includes a field that specifies service-specific information in accordance with the techniques described in this disclosure.

FIG. 6 is a diagram illustrating an exemplary Intermediate System-to Intermediate System (IS-IS) routing protocol message 250 that includes a field that specifies service-specific information in accordance with the techniques described in this disclosure. IS-IS routing protocol message (RPM) 250 includes header fields 252A-252T. Intradomain routing protocol discriminator field 252A stores an architectural constant that identifies this message as corresponding to the IS-IS routing protocol. Length indicator field 252B identifies the length of fixed header in octets. Version/protocol identifier (ID) extension field 252C stores a value of one to identify this as the second version of IS-IS. ID length field 252D stores the length of the ID field of network service access point (NSAP) addresses and network entity titles (NETs) used in the corresponding routing domain. Fields 252E-G are reserved for future use/expansion. PDU type field 252H stores the type of the payload data unit (which is another way of referring to IS-IS routing protocol message 250). Version field 252I stores a value of one, while reserved field 252J is reserved again for future use/expansion. Maximum area addresses field 252K stores a value indicating a number of area addresses permitted for this intermediate system area, as derived form the value of the system management parameter maximumArea-Addresses.

PDU length field 252L stores a value indicating the entire length of the PDU (including variable fields) in octets. Remaining lifetime field 252M stores a value indicating a number of seconds before the link state protocol data unit (LSP) is considered expired. LSP ID field 252N stores a value identifying the system ID of the source of the LSP. Sequence number field 252O stores a sequence number of the LSP. Checksum field 252P stores a value defining a checksum of the contents of the LSP from the source ID to the end. P/ATT/LSPDBOL/IS type fields 252Q-T store a number of bits that are used to signal various functionalities and attributes of the source of the routing protocol message. More information regarding IS-IS and IS-IS PDUs is described in more detail in International Standard ISO/IEC 10589, entitled "Information Technology-Telecommunications and Information Exchange Between Systems—Intermediate System to Intermediate System Intra-domain Routeing Information Exchange Protocol for Providing the Connectionaless-Mode Network Service (ISO 8473)," dated Nov. 15, 2002, the entire contents of which are hereby incorporated by reference.

While IS-IS provides for extensions to the PDU in the form of variable length fields specified in accordance with a type-length-value (TLV) field format, these extensible fields are reserved for communicating information related to the IS-IS routing protocol. An extension to the IS-IS routing protocol adapts IS-IS for communicating generic information (GENINFO) that is not directly related to the operation of the IS-IS protocol. This GENINFO extension is defined in a Network Working Group Internet Draft entitled "Advertising Generic Information in IS-IS," dated Nov. 10, 2010, the entire contents of which are hereby incorporated by reference. Using this extension to IS-IS, as one example, the service-specific information described above may be encoded in a TLV denoted as service-specific information field 254. Service-specific information field 254 may include sub-fields defining flags, an application identifier, and application IP address information, as well as, the service-specific information. The flags subfield identifies how the service-specific information is to be flooded, as one example. The application identifier sub-field identifies the identifier assigned to the application. The Application IP address information sub-field identifies either or both the IPv4 or IPv6 address associated with the application. Using this information, routers, switches and other network devices may determine to which application the service-specific information field 254 corresponds.

While described above with respect to IS-IS routing protocol, the techniques may be implemented with respect to other routing protocols that provide for TLV or other fields to which service-specific information may be stored. These other routing protocols may include OSPF and BGP, to name a few examples. In this respect, the techniques should not be limited to the IS-IS routing protocol described above.

Various embodiments of the invention have been described. These and other embodiments are within the scope of the following claims.

The invention claimed is:

1. A method comprising:
  receiving, with a service node of a network, traffic via a path configured within the network to direct the traffic from an ingress network device of the path to the service node, wherein the ingress network device applies filters that control admission of the traffic at the ingress network device to the path;
  applying, with the service node, one or more services to the traffic received via the path;
  generating, with the service node, service-specific information related to the application of the one or more services to the traffic by the service node; and
  sending, with the service node, the service-specific information to at least one network device configured to forward the traffic along the path so that the at least one network device adapts the path based on the service-specific information to forward at least a portion of the traffic on a second path that bypasses the service node.

2. The method of claim 1, wherein sending the service-specific information comprises sending the service-specific information to the at least one network device using a field of one or more of an Intermediate System to Intermediate System (IS-IS) routing protocol, an Open Shortest Path First (OSPF) routing protocol, a Border Gateway Protocol (BGP), and a simple network management protocol (SNMP).

3. The method of claim 1, wherein sending the service-specific information comprises sending the service-specific information to the at least one network device in a generic information type-length-value (GENINFO TLV) field specified in accordance with an Intermediate System to Intermediate System (IS-IS) routing protocol.

4. The method of claim 1, wherein the path comprises a path configured through the network in accordance with configuration data specified by an orchestrating device that computes and configures paths through the network and that does not forward any data through the network other than that used to compute and configure the paths through the network.

5. The method of claim 1,
  wherein applying one or more services comprises applying one or more of a uniform resource locator (URL) filtering service, and
  wherein generating, with the service node, service-specific information comprises generating service-specific information describing one or more of a filter by-pass state for the URL filtering service instructing the network device to bypass application of services at the service node for traffic destined for one or more specified URLs.

6. The method of claim 1,
  wherein applying one or more services comprises applying the one or more services to flows associated with a set of one or more virtual private networks (VPNs),
  wherein the method comprises determining that the set of one or more VPNs has changed such that one or more of the VPNs of the set of one or more VPNs is removed or one or more new VPNs are added to the set of one or more VPNs,
  wherein generating, with the service node, service-specific information comprises generating service-specific information describing the change to the set of one or more VPNs.

7. The method of claim 1,
  wherein generating, with the service node, service-specific information comprises generating service-specific information describing one or more of execution results of the applied one or more services and service state information between the at least one network device configured to forward the traffic along the path and the service node, and
  wherein the service state information comprises one or more of a current load and performance between the at least one network device configured to forward the traffic along the path and the service node.

8. The method of claim 1,
  wherein the service node includes a control plane, a forwarding plane and a service plane,
  wherein applying the one or more services comprises applying, with one or more service modules of the service plane, the one or more services to the traffic received via the path,
  wherein generating the service-specific information comprises:
  executing a service monitoring module in the control plane of the service node that monitors the application of the one or more services by the one or more service modules; and
  based on the monitoring of the application of the one or more services by the one or more service modules, generating, with the service monitoring module, the service specific information related to the application of the one or more services to the traffic by the service node, and
  wherein sending the service-specific information comprises sending, with the forwarding plane of the service node, the service-specific information to at least one network device configured to forward the traffic along the path so that the at least one network device configured to forward the traffic along the path adapts the path based on the service-specific information.

9. The method of claim 1, wherein sending the service-specific information comprises sending the service-specific information to the at least one network device configured to forward the traffic via the path using a field of a link-state routing protocol message.

10. The method of claim 1, wherein receiving the traffic via the path comprises receiving traffic tunneled on an overlay network path through an overlay network of the network.

11. A service node comprising:
at least one interface that receives traffic via a path configured within a network to direct the traffic from an ingress network device of the path to the service node; and
a control unit that applies one or more services to the traffic received via the path and generates service-specific information related to the application of the one or more services to the traffic,
wherein the at least one interface sends the service-specific information to at least one network device configured to forward the traffic via the path so that the at least one network device is able to adapt the path based on the service-specific information to forward at least a portion of the traffic on a second path that bypasses the service node.

12. The service node of claim 11, wherein the at least one interface sends the service-specific information to the at least one network device using a field of one or more of an Intermediate System to Intermediate System (IS-IS) routing protocol, an Open Shortest Path First (OSPF) routing protocol, a Border Gateway Protocol (BGP), and a simple network management protocol (SNMP).

13. The service node of claim 11, wherein the at least one interface sends the service-specific information to the at least one network device in a generic information type-length-value (GENINFO TLV) field specified in accordance with an Intermediate System to Intermediate System (IS-IS) routing protocol.

14. The service node of claim 11, wherein the path comprises a path configured through the network in accordance with configuration data specified by an orchestrating device that computes and configures paths through the network and that does not forward any data through the network other than that used to compute and configure the paths through the network.

15. The service node of claim 11, wherein the control unit includes:
a service module that applies one or more of a uniform resource locator (URL) filtering service; and
a service monitoring module that generates service-specific information describing one or more of a filter bypass state for the URL filtering service instructing the network device to bypass application of services at the service node for traffic destined for one or more specified URLs.

16. The service node of claim 11, wherein the control unit includes:
one or more service modules that apply the one or more services to flows associated with a set of one or more virtual private networks (VPNs); and
a service monitoring module that determines that the set of one or more VPNs has changed such that one or more of the VPNs of the set of one or more VPNs is removed or one or more new VPNs are added to the set of one or more VPNs and generates service-specific information describing the change to the set of one or more VPNs.

17. The service node of claim 11, wherein the control unit includes:
a service monitoring module that generates service-specific information describing one or more of execution results of the applied one or more services and service state information between the at least one network device configured to forward the traffic along the path and the service node, and wherein the service state information comprises one or more of a current load and performance between the at least one network device configured to forward the traffic along the path and the service node.

18. The service node of claim 11,
wherein the control unit includes a control plane, a forwarding plane and a service plane,
wherein the service plane includes one or more service modules that apply the one or more services to the traffic received via the path,
wherein the control plane executes a service monitoring module that monitors the application of the one or more services by the one or more service modules and, based on the monitoring of the application of the one or more services by the one or more service modules, generates the service specific information related to the application of the one or more services to the traffic by the service node, and
wherein the forwarding plane includes the at least one interface that sends the service-specific information to at least one network device configured to forward the traffic along the path so that the at least one network device configured to forward the traffic along the path adapts the path based on the service-specific information.

19. The service node of claim 11, wherein the at least one interface sends the service-specific information to the at least one network device configured to forward the traffic via the path using a field of a link-state routing protocol message.

20. A non-transitory computer-readable medium comprising instructions that, when executed, cause one or more processors of a service node of a network to:
receive traffic via a path configured within the network to direct the traffic from an ingress network device of the path to the service node;
apply one or more services to the traffic received via the path;
generate service-specific information related to the application of the one or more services to the traffic; and
send the service-specific information to at least one network device configured to forward the traffic via the path so that the at least one network device is able to adapt the path based on the service-specific information to forward at least a portion of the traffic on a second path that bypasses the service node.

21. A method comprising:
receiving, by a network device, configuration data to configure a path by which to forward traffic from an ingress network device to a service node, wherein the configuration data is received from an orchestrating device that computes and configures paths through the network and that does not forward any traffic through the network other than that used to compute and configure the paths through the network;
forwarding, by the network device, the traffic along the path to the service node to enable the service node to apply one or more services to the traffic;
receiving, by the network device and from the service node, service-specific information related to the application of the one or more services by the service node to the traffic; and
re-configuring, by the network device, the path based on the received service-specific information to forward at least a portion of the traffic on a second path that bypasses the service node.

22. The method of claim 21, wherein receiving the service-specific information comprises receiving the service-specific information via a field of one or more of an Intermediate System to Intermediate System (IS-IS) routing protocol, an Open Shortest Path First (OSPF) routing protocol, a Border Gateway Protocol (BGP) and a simple network management protocol (SNMP).

23. The method of claim 21, wherein receiving the service-specific information comprises receiving the service-specific information in a generic information type-length-value (GENINFO TLV) field specified in accordance with an Intermediate System to Intermediate System (IS-IS) routing protocol.

24. The method of claim 21,
wherein the network device comprises the ingress network device to the path,
wherein receiving the configuration data comprises receiving one or more filters that control admission of traffic to the path,
the method further comprising installing the one or more filters to control admission of the traffic to the path,
wherein the service-specific information comprises service-specific information describing a filter by-pass state for a URL filtering service applied by the service node to the traffic, the filter by-pass state instructing the network device to bypass application of services at the service node for traffic destined for one or more specified URLs, and
wherein re-configuring the path comprises re-configuring the filters that control admission of the traffic to the path based on the service-specific information describing the filter by-pass state for the URL filtering service.

25. The method of claim 21,
wherein the network device comprises the ingress network device to the path,
wherein receiving the configuration data comprises receiving one or more filters that control admission of traffic to the path such that only traffic associated with a set of one or more virtual private networks (VPNs) is admitted to the path,
the method further comprising installing the one or more filters to control admission of the traffic to the path,
wherein the service-specific information comprises service-specific information describing a change to the set of the one or more VPNs, and
wherein re-configuring the path comprises re-configuring the filters that control admission of the traffic to the path based on the service-specific information describing the change to the set of one or more VPNs.

26. The method of claim 21,
wherein the network device comprises the ingress network device to the path,
wherein receiving the configuration data comprises receiving one or more filters that control admission of traffic to the path,
the method further comprising installing the one or more filters to control admission of the traffic to the path,
wherein the service-specific information comprises service-specific information describing a firewall context for a firewall service applied by the service node to the traffic, and
wherein re-configuring the path comprises re-configuring the filters that control admission of the traffic to the path based on the service-specific information describing the firewall context for the VPN service.

27. The method of claim 21,
wherein the service-specific information comprises service-specific information describing one or more of execution results of the applied one or more services and service state information between the at least one network device configured to forward the traffic along the path and the service node, wherein the service state information comprises one or more of a current load and performance between the network device and the service node, and
wherein re-configuring the path comprises re-configuring the path to forward at least some of the traffic from the ingress network device on the second path to a different service node based on the service-specific information describing one or more of a current load and performance between the network device and the service node.

28. The method of claim 21, wherein receiving the service-specific information comprises receiving the service-specific information via a field of a link state routing protocol message.

29. The method of claim 28, further comprising communicating the received service-specific information from a link state routing protocol executing on the network device to overlay network control plane software executing on the network device.

30. A network device comprising:
a control unit configured to forward traffic along a path from an ingress network device to a service node in accordance with configuration data received from an orchestrating device that computes and configures paths through the network and that does not forward any traffic through the network other than that used to compute and configure the paths through the network; and
at least one interface that forwards the traffic along the path to enable the service node to apply one or more services to the traffic and receives from the service node service-specific information related to the application of the one or more services by the service node to the traffic,
wherein the control unit re-configures the path based on the received service-specific information to forward at least a portion of the traffic on a second path that bypasses the service node.

31. The network device of claim 30, wherein the at least one interface receives the service-specific information via a field of one or more of an Intermediate System to Intermediate System (IS-IS) routing protocol, an Open Shortest Path First (OSPF) routing protocol, a Border Gateway Protocol (BGP) and a simple network management protocol (SNMP).

32. The network device of claim 30, wherein the at least one interface receives the service-specific information in a generic information type-length-value (GENINFO TLV) field specified in accordance with an Intermediate System to Intermediate System (IS-IS) routing protocol.

33. The network device of claim 30,
wherein the network device comprises the ingress network device to the path,
wherein, based on the received configuration data, the control unit configures one or more filters that control admission of traffic to the path,
wherein the service-specific information comprises service-specific information describing a filter by-pass state for a URL filtering service applied by the service node to the traffic, the filter by-pass state instructing the network device to bypass application of services at the service node for traffic destined for one or more specified URLs, and
wherein the control unit re-configures the filters that control admission of the traffic to the path based on the service-specific information describing the filter by-pass state for the URL filtering service.

34. The network device of claim 30,
wherein the network device comprises the ingress network device to the path,
wherein, based on the received configuration data, the control unit configures one or more filters that control admission of traffic to the path such that only traffic associated with a set of one or more virtual private networks (VPNs) is admitted to the path,
wherein the service-specific information comprises service-specific information describing a change to the set of the one or more VPNs, and
wherein the control unit re-configures the filters that control admission of the traffic to the path based on the service-specific information describing the change to the set of one or more VPNs.

35. The network device of claim 30,
wherein the network device comprises the ingress network device to the path,
wherein, based on the received configuration data, the control unit configures one or more filters that control admission of traffic to the path,
wherein the service-specific information comprises service-specific information describing a firewall context for a firewall service applied by the service node to the traffic, and
wherein the control unit re-configures the filters that control admission of the traffic to the path based on the service-specific information describing the firewall context for the VPN service.

36. The network device of claim 30,
wherein the service-specific information comprises service-specific information describing one or more of execution results of the applied one or more services and service state information between the at least one network device configured to forward the traffic along the path and the service node, wherein the service state information comprises one or more of a current load and performance between the network device and the service node, and
wherein the control unit re-configures the path to forward at least some of the traffic from the ingress network device on the second path to a different service node based on the service-specific information describing one or more of a current load and performance between the network device and the service node.

37. The network device of claim 30, wherein the at least one interface receives the service-specific information via a field of a link state routing protocol message.

38. A non-transitory computer-readable medium comprising instructions that, when executed, cause one or more processors of a network device to:
receive configuration data to configure a path in a forwarding plane of the network device by which to forward traffic from an ingress network device to a service node, wherein the network device receives the configuration data from an orchestrating device that computes and configures paths through the network and that does not forward any traffic through the network other than that used to compute and configure the paths through the network;
forward the traffic along the path to the service node as configured in the forwarding plane to enable the service node to apply one or more services to the traffic;
receive from the service node service-specific information related to the application of the one or more services by the service node to the traffic;
re-configure the path in the forwarding plane of the network device based on the received service-specific information to forward at least a portion of the traffic on a second path that bypasses the service node.

39. A network system comprising:
a software-defined network; and
an orchestrating device that computes and configures paths through the software-defined network and that does not forward any traffic through the software-defined network other than that used to compute and configure the paths through the software-defined network,
wherein the software defined-network includes:
a service node; and
an ingress network device,
wherein the ingress network device comprises:
a control unit configured to forward traffic along a path from the ingress network device to the service node in accordance with configuration data received from the orchestrating device; and
at least one interface that forwards the traffic along the path to the service node to enable the service node to apply one or more services to the traffic,
wherein the service node comprises:
at least one interface that receives the traffic via the path; and
a control unit that applies the one or more services to the traffic received via the path and generates service-specific information related to the application of the one or more services to the traffic,
wherein the at least one interface of the service node sends the service-specific information to the ingress network device, and
wherein in response to the ingress network device receiving the service-specific information, the control unit of the ingress network device re-configures the path to forward at least a portion of the traffic on a second path that bypasses the service node.

* * * * *